US011101694B2

(12) United States Patent
Lee et al.

(10) Patent No.: US 11,101,694 B2
(45) Date of Patent: Aug. 24, 2021

(54) WIRELESS POWER TRANSMITTER, ELECTRONIC DEVICE FOR WIRELESSLY RECEIVING POWER, AND METHOD FOR OPERATING THE SAME

(71) Applicant: SAMSUNG ELECTRONICS CO., LTD., Suwon-si (KR)

(72) Inventors: Kyungwoo Lee, Suwon-si (KR); Sungkweon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/682,264

(22) Filed: Nov. 13, 2019

(65) Prior Publication Data
US 2020/0153279 A1 May 14, 2020

(30) Foreign Application Priority Data

Nov. 13, 2018 (KR) .......................... 10-2018-0138957

(51) Int. Cl.
*H02J 50/10* (2016.01)
*H02J 50/80* (2016.01)
(Continued)

(52) U.S. Cl.
CPC .............. *H02J 50/10* (2016.02); *A47L 25/00* (2013.01); *H02J 7/025* (2013.01); *H02J 50/80* (2016.02); *H02J 50/90* (2016.02)

(58) Field of Classification Search
CPC .. H02J 50/10; H02J 50/12; H02J 50/80; H02J 50/90
(Continued)

(56) References Cited

U.S. PATENT DOCUMENTS 6,504,610 B1* 1/2003 Bauer ................... G01B 11/272
356/399
2010/0324736 A1* 12/2010 Yoo ....................... G05D 1/0234
700/259
(Continued)

FOREIGN PATENT DOCUMENTS

KR 10-2010-0128839 A 12/2010
KR 10-2018-0122216 A 11/2018
WO 2018/034990 A 2/2018

OTHER PUBLICATIONS

International Search Report (PCT/ISA/210) dated Feb. 25, 2020 issued by the International Searching Authority in International Application No. PCT/KR2019/015268.
(Continued)

*Primary Examiner* — William Hernandez
(74) *Attorney, Agent, or Firm* — Sughrue Mion, PLLC

(57) ABSTRACT

Provided are a method and an electronic device that may be coupled to a host device, the electronic device including a housing detachable to the host device, a light generator disposed on a first surface of the housing, a power transmission circuit disposed on a second surface of the housing, the second surface being opposite to the first surface, and a processor that controls the light generator to output a light, wherein an external electronic device moves to a predetermined position based on the outputted light, and control to wirelessly transmit power to the external electronic device via the power transmission circuit based on the external electronic device moving to the predetermined position.

20 Claims, 21 Drawing Sheets

(51) Int. Cl.
  *H02J 50/90*   (2016.01)
  *A47L 25/00*   (2006.01)
  *H02J 7/02*    (2016.01)

(58) Field of Classification Search
  USPC .......................................................... 307/104
  See application file for complete search history.

(56) References Cited

U.S. PATENT DOCUMENTS

| | | |
|---|---|---|
| 2011/0241616 A1 | 10/2011 | Kim et al. |
| 2012/0074891 A1 | 3/2012 | Anderson et al. |
| 2014/0222271 A1 | 8/2014 | Merten et al. |
| 2016/0197571 A1 | 7/2016 | Olson et al. |
| 2017/0102709 A1* | 4/2017 | Kwak .................... A47L 9/2847 |
| 2017/0164800 A1 | 6/2017 | Arakawa |
| 2018/0014709 A1 | 1/2018 | O'Brien et al. |
| 2018/0188737 A1* | 7/2018 | Won ...................... G05D 1/0234 |
| 2018/0198312 A1* | 7/2018 | Peek ...................... H02J 7/0042 |
| 2018/0199776 A1 | 7/2018 | Sato et al. |
| 2020/0077859 A1* | 3/2020 | Nien ....................... B60L 53/37 |
| 2020/0093342 A1* | 3/2020 | Jeong ........................ H02J 7/00 |

OTHER PUBLICATIONS

Written Opinion (PCT/ISA/237) dated Feb. 25, 2020 issued by the International Searching Authority in International Application No. PCT/KR2019/015268.
Communication dated Mar. 23, 2021, issued by the European Patent Office in European Application No. 19885660.1.

* cited by examiner

WIRELESS POWER TRANSMITTER, ELECTRONIC DEVICE FOR WIRELESSLY RECEIVING POWER, AND METHOD FOR OPERATING THE SAME

CROSS-REFERENCE TO RELATED APPLICATION(S)

This application is based on and claims priority under 35 U.S.C. § 119 to Korean Patent Application No. 10-2018-0138957, filed on Nov. 13, 2018, in the Korean Intellectual Property Office, the disclosure of which is incorporated by reference herein in its entirety.

BACKGROUND

1. Field

The disclosure relates to electronic devices for wirelessly transmitting power, external electronic devices for wirelessly receiving power, and methods for operating the same.

2. Description of Related Art

Portable digital communication devices have become important items for modern people. Customers desire to receive various high-quality services anytime, anywhere. The Internet of Thing (IoT) technology integrates various sensors, home appliances, and communication devices up into a single network. A diversity of sensors require a wireless power transmission system for seamless operations.

Wireless power transmission may be performed in a magnetic induction, magnetic resonance, and electromagnetic wave scheme. The magnetic induction or magnetic resonance scheme is advantageous in charging electronic devices positioned within a relatively short distance from the electronic device (e.g., wireless power transmitter). The electromagnetic wave scheme is more advantageous for remote power transmission that reaches a few meters as compared with the magnetic induction or magnetic resonance scheme.

Various kinds of movable electronic devices are widely used (e.g., robots). These electronic devices are equipped with wheels, two legs, flying propellers, or other various moving means to move from one position to another. The electronic devices may approach a charging station (e.g., a dock) for wireless charging and be charged using magnetic fields produced from the charging station.

Typically, charging stations for electronic devices are connected to power outlets installed on the wall and are placed on the floor. An electronic device, e.g., a robot vacuum, approaches the charging station, and the charging station may wiredly or wirelessly charge the electronic device. However, as the charging station is placed on the floor, the user may be highly likely to hit the charging station while walking on the floor. Further, the need for space to place charging stations may limit living space.

The above information is presented as background information only to assist with an understanding of the disclosure. No determination has been made, and no assertion is made, as to whether any of the above might be applicable as prior art with regard to the disclosure.

SUMMARY

Provided is an electronic device which may be placed in a lower empty space of another pre-placed electronic device. Also provided are an pre-placed including an emblem used for an external electronic device to determine a path and a power transmission circuit, an external electronic device determining a path using the emblem, and a method for controlling the same.

In accordance with an aspect of the disclosure, there is provided an electronic device coupled to a host device, the pre-placed including: a housing detachable to the host device; a light generator disposed on a first surface of the housing; a power transmission circuit disposed on a second surface of the housing, the second surface being opposite to the first surface; and a processor configured to: control the light generator to output a light, wherein an external electronic device moves to a predetermined position based on the outputted light, and control to wirelessly transmit power to the external electronic device via the power transmission circuit based on the external electronic device moving to the predetermined position.

The processor may be further configured to: based on detecting that the external electronic device has moved to the predetermined position, control to wirelessly transmit the power via the power transmission circuit.

The electronic device may further include a power interface; a converter configured to receive, via the power interface, direct current (DC) power from a power supply of the host device and convert a voltage of the received DC power into a predetermined magnitude of voltage; and an inverter configured to generate alternating current (AC) power based on the received DC power with the predetermined magnitude of voltage and provide the generated AC power to the power transmission circuit.

The electronic device may further include a power interface; a rectification circuit configured to receive, via the power interface, alternating current (AC) power from an external power source and rectify the received AC power to direct current (DC) power; a converter configured to receive the DC power from the rectification circuit and convert a voltage of the received DC power into a predetermined magnitude of voltage; and an inverter configured to generate AC power based on the received DC power with the predetermined magnitude of voltage and provide the generated AC power to the power transmission circuit.

The electronic device may further include a data line configured to connect the processor and the light generator through the housing or along at least one surface of the housing, wherein the processor may be further configured to output data for outputting the light through the data line to the light generator.

The light generator may include at least one light emitting device configured to radiate infrared (IR) light in a predetermined range.

The electronic device may further include a communication circuit configured to communicate with the external electronic device, wherein the processor may be further configured to: receive information for a remaining power of a battery of the external electronic device from the external electronic device via the communication circuit, and based on identifying that the remaining power of the battery of the external electronic device meets a predetermined condition, control the light generator to output the light.

The housing may be further configured to be connected to a lower portion of a housing of the host device, and wherein the power transmission circuit may be disposed in an inner lower portion of the electronic device.

In accordance with an aspect of the disclosure, there is provided an electronic device coupled to a host device, the electronic device including: a housing detachable to the host device; an emblem disposed on a first surface of the housing, the emblem being configured to assist with moving an external electronic device to a predetermined position for wireless charging; a power transmission circuit disposed on a second surface of the housing, the second surface being opposite to the first surface; and a processor configured to control to wirelessly transmit power to the external electronic device via the power transmission circuit based on the external electronic device moving to the predetermined position.

The processor may be configured to: based on detecting that the external electronic device has moved to the predetermined position, control to wirelessly transmit the power via the power transmission circuit.

The electronic device may further include a power interface; a converter configured to receive, via the power interface, direct current (DC) power from a power supply of the host device and convert a voltage of the received DC power into a predetermined magnitude of voltage; and an inverter configured to generate alternating current (AC) power based on the received DC power with the predetermined magnitude of voltage and provide the generated AC power to the power transmission circuit.

The electronic device may further include a power interface; a rectification circuit configured to receive, via the power interface, alternating current (AC) power from an external power source and rectify the received AC power to DC power; a converter configured to receive the DC power from the rectification circuit and convert a voltage of the received direct current (DC) power into a predetermined magnitude of voltage; and an inverter configured to generate AC power based on the received DC power with the predetermined magnitude of voltage and provide the generated AC power to the power transmission circuit.

The electronic device may further include a communication circuit configured to communicate with the external electronic device, wherein the processor may be further configured to: receive information for a remaining power of a battery of the external electronic device from the external electronic device via the communication circuit, and based on identifying that the remaining power of the battery of the external electronic device meets a predetermined condition, transmit a communication signal to control the external electronic device to move to the predetermined position.

The housing may be further configured to be connected to a lower portion of a housing of the host device, and wherein the power transmission circuit may be disposed in an inner lower portion of the electronic device.

The emblem may be disposed in a position where it may be sensed by the external electronic device.

The external electronic device may be configured to: identify a captured image of the emblem, and perform either one or both of moving and rotating until a pattern corresponding to the emblem meets a predetermined condition.

In accordance with an aspect of the disclosure, there is provided an electronic device coupled to a host device, the electronic device including: a housing detachable to the host device; a light generator disposed on a first surface of the housing; a bottom tray disposed in a lower portion of the housing, the bottom tray being withdrawable to an outside of the host device; a power transmission circuit disposed in the bottom tray; and a processor configured to: control to cause the bottom tray to be positioned inside the host device; control the light generator to output a light, wherein an external electronic device moves to a predetermined position based on the outputted light; control to cause the bottom tray to be positioned outside the host device before the external electronic device moves to the predetermined position; and control to wirelessly transmit power via the power transmission circuit after the external electronic device moves to the predetermined position.

A lower portion of the bottom tray may have a first width, wherein an upper portion of the bottom tray may have a second width, and wherein the first width may be larger than the second width.

The external electronic device may have substantially a same width as the second width, wherein a power transmission coil of the power transmission circuit may be disposed at a point that is a first distance away from the lower portion of the bottom tray, and wherein a power reception coil may be disposed at a point that is the first distance away from a side of the external electronic device.

The external electronic device may include a dust container, and wherein the bottom tray may include a pipe configured to connect with the dust container of the external electronic device.

In accordance with an aspect of the disclosure, there is provided a method of controlling a coupling of an electronic device and a host device, the method including: coupling a housing of the electronic device to the host device; controlling a light generator, which is disposed on a first surface of the housing, to output a light, wherein an external electronic device moves to a predetermined position based on the outputted light; and controlling to wirelessly transmit power to the external electronic device via a power transmission circuit based on the external electronic device moving to the predetermined position.

The method may include receiving direct current (DC) power from a power supply of the host device; converting a voltage of the received DC power into a predetermined magnitude of voltage; and generating alternating current (AC) power based on the received DC power with predetermined magnitude of voltage and providing the generated AC power to the power transmission circuit.

The method may include receiving alternating current (AC) power from an external power source; rectifying the received AC power to direct current (DC) power; receiving the DC power and converting a voltage of the received DC power into a predetermined magnitude of voltage; and generating AC power based on the received DC power with the predetermined magnitude of voltage and providing the generated AC power to the power transmission circuit.

The method may include receiving information for a remaining power of a battery of the external electronic device from the external electronic device, and based on identifying that the remaining power of the battery of the external electronic device meets a predetermined condition, controlling the light generator to output the light.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
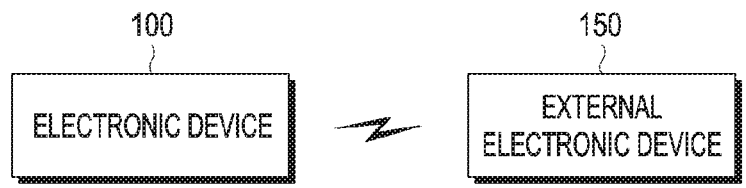
FIG. 1 is a block diagram illustrating an electronic device and an external electronic device, according to an embodiment.

Embodiments of the disclosure are described with reference to the accompanying drawings. However, it should be appreciated that the disclosure is not limited to the embodiments and the terminology used herein, and all changes and/or equivalents or replacements thereto also belong to the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may use various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

The term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

Examples of the electronic device or external electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, and/or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), and/or a body implantable device. In one or more embodiments, examples of the electronic device or external electronic device may include at least one of a television, a set-top box wiredly or wirelessly connected with a TV, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, an electric car, and/or an electronic picture frame.

According to an embodiment of the disclosure, the electronic device or the external electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, and/or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to one or more embodiments of the disclosure, examples of the electronic device or external electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the electronic device or external electronic device may be flexible or may be a combination of the above-enumerated electronic devices. According to an embodiment of the disclosure, the electronic device or external electronic device is not limited to the above-listed embodiments. As used herein, the term "user" may denote a human or another device (e.g., an artificial intelligent electronic device) using the external electronic device or the electronic device.

FIG. 1 is a block diagram illustrating an electronic device and an external electronic device, according to an embodiment.

Referring to FIG. 1, according to an embodiment, an electronic device (e.g., wireless power transmitter) 100 may wirelessly transmit power to at least one external electronic device 150. The electronic device 100 may transmit power to the external electronic device 150 according to various charging schemes. For example, the electronic device 100 may transmit power in an induction scheme. Adopting the induction scheme, the electronic device 100 may include, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may constitute a resonance circuit. The electronic device 100 may be implemented in a scheme defined in the wireless power consortium (WPC) standards (or Qi standards). For example, the electronic device 100 may transmit power in a resonance scheme. Adopting the resonance scheme, the electronic device 100 may include, e.g., a power source, a DC-AC converting circuit, an amplifying circuit, an impedance matching circuit, at least one capacitor, at least one coil, and an out-band communication circuit (e.g., a Bluetooth low energy (BLE) communication circuit). The at least one capacitor and the at least one coil may constitute a resonance circuit. The electronic device 100 may be implemented in a scheme defined in the alliance for wireless power (A4WP) standards (or air fuel alliance (AFA) standards). The electronic device 100 may include a coil that is capable of producing a magnetic field when letting an electric current flow thereacross by a resonance or induction scheme. The process of the electronic device 100 producing an induced magnetic field may be represented as the electronic device 100 wirelessly transmitting power. Further, the external electronic device 150 may include a coil that produces an induced electromotive force by the magnetic field generated around and varying in magnitude over time. The process of the external electronic device 150 producing an induced electromotive force through the coil may be represented as the external electronic device 150 wirelessly receiving power. For example, the electronic device 100 may transmit power in an electromagnetic scheme. Adopting the electromagnetic scheme, the electronic device 100 may include, e.g., a power source, a DC-AC converting circuit, an amplifying circuit, a distributing circuit, a phase shifter, a power transmission antenna array including a plurality of patch antennas, and an out-band communication circuit (e.g., a BLE communication module). Each of the plurality of patch antennas may form a radio frequency (RF) wave. The external electronic device 150 may include patch antennas capable of outputting electric current using RF waves generated around. The process of the electronic device 100 producing RF waves may be represented as the electronic device 100 wirelessly transmitting power. The process of the external electronic device 150 outputting electric current from the patch antennas using RF waves may be represented as the external electronic device 150 wirelessly receiving power.

According to an embodiment, the electronic device 100 may communicate with the external electronic device 150. For example, the electronic device 100 may communicate with the external electronic device 150 as per an in-band scheme. The electronic device 100 or the external electronic device 150 may vary the load (or impedance) on the data to be transmitted, according to, e.g., an on/off keying modulation scheme. The electronic device 100 or the external electronic device 150 may determine data transmitted from its opposite device by measuring a variation in load or impedance based on a variation in the current, voltage, or power across the coil. For example, the electronic device 100 may communicate with the external electronic device 150 as per an out-band scheme. The electronic device 100 or the external electronic device 150 may communicate data using a communication circuit (e.g., a BLE communication module) provided separately from the coil or patch antennas. The electronic device may also transmit media data and, according to implementation, a plurality of different communication circuits (e.g., a BLE communication module, a Wi-Fi module, a Wi-gig module) each may transmit or receive media data or wireless power transmission/reception signals.

Figure 2:
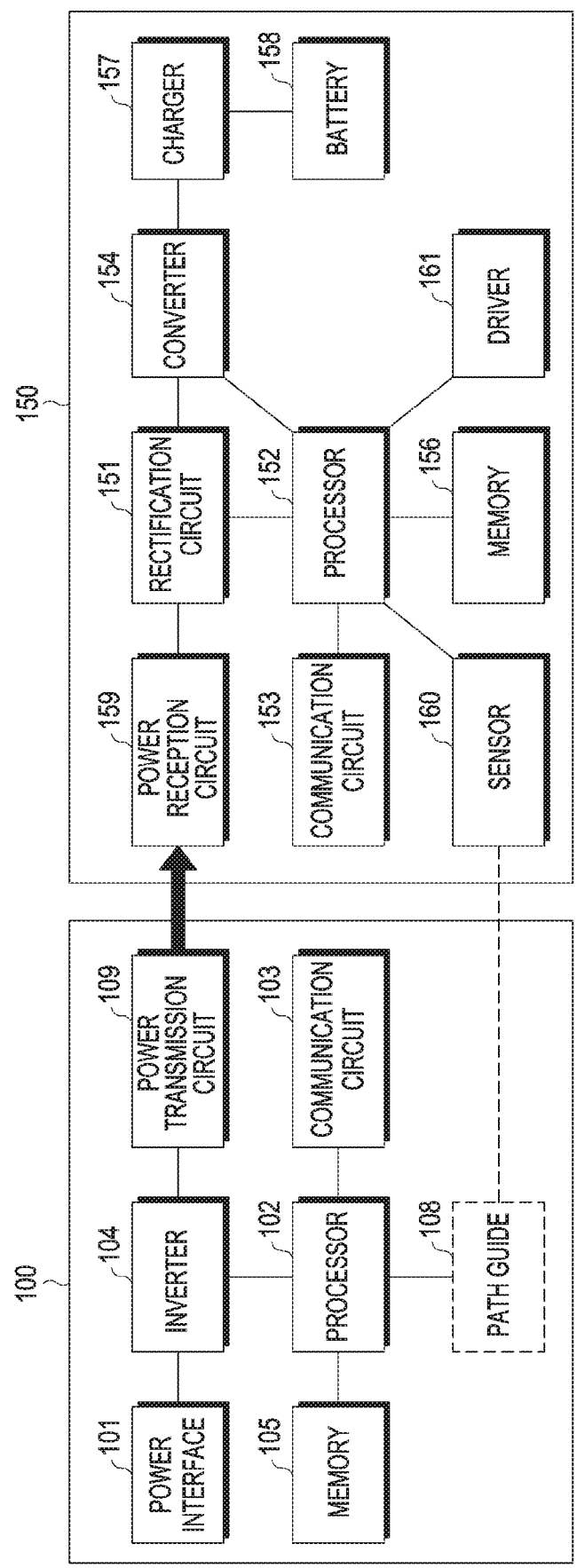
FIG. 2 is a block diagram illustrating an electronic device and an external electronic device, according to an embodiment.

FIG. 2 is a block diagram illustrating an electronic device and an external electronic device, according to an embodiment.

According to an embodiment, an electronic device 100 may include at least one of a power interface 101, a processor 102, a communication circuit 103, an inverter 104, a memory 105, a path guide 108 (e.g., light generator), or a power transmission circuit 109. According to an embodiment, an external electronic device 150 may include at least one of a rectification circuit 151, a processor 152, a communication circuit 153, a converter 154, a memory 156, a charger 157, a battery 158, a power reception circuit 159, a sensor 160, or a driver 161.

According to an embodiment, the power interface 101 may receive power from a host device and transfer the power to the inverter 104. The power interface 101 may be wiredly connected with, e.g., the power supply of a host device (e.g., a home appliance, e.g., an air conditioner). Direct current (DC) power may be received via the power interface 101 from the power supply of the host device. The power interface 101 may include electric lines or wires for connecting the electronic device and the host device and various types of plugs which may be inserted to the power supply of the host device. In this case, the plug may be inserted to the power supply of the host device, and the inverter 104 may receive DC power from the power supply of the host device via the electric lines. According to an embodiment, the electronic device may further include a converter (e.g., a DC/DC converter) electrically connected between the power interface 101 and the inverter 104. The DC/DC converter may convert (e.g., boost-convert or buck-convert) power received via the power interface 101 and transfer the converted power to the inverter 104. According to an embodiment, the electronic device may receive alternating current (AC) power from an external power source, and this is described below in greater detail.

The inverter 104 may invert the received DC power into AC power. The inverter 104 may transfer the AC power to the power transmission circuit 109. The inverter 104 may transfer AC power with a designated frequency to the power transmission circuit 109. The designated frequency may be determined depending on the power transmission scheme the electronic device 100 adopted. For example, the designated frequency may be set in a range from 100 kHz to 200 kHz when the Qi standards are adopted. For example, the designated frequency may be set to 6.78 MHz when the AFA standards are adopted. The above-mentioned frequencies are merely an example, and the frequency of the AC power is not limited thereto.

The power transmission circuit 109 may produce a magnetic field or electromagnetic field using the received AC power. For example, the power transmission circuit 109 may include a resonance circuit with a designated resonance frequency. The power transmission circuit 109 may include at least one coil. The coil may produce a magnetic field based on current applied thereto.

The processor 102 may control the magnitude of power that the power transmitting circuit 109 transmits. For example, the processor 102 may control the magnitude of power output via the power interface 101, control the gain of a power amplifier included in the power transmitting circuit 109, or convert the inverter 104, thereby controlling the magnitude of power that the power transmitting circuit 109 transmits. The processor 102 may control the magnitude of power applied to the power transmitting circuit 109 by controlling the magnitude of the bias voltage of the power amplifier. The processor 102 or the processor 152 may be implemented in various circuits capable of performing calculation, such as a central processing unit (CPU) or other general-purpose processors, a mini-computer, a microprocessor, a micro controlling unit (MCU), or a field programmable gate array (FPGA), but not limited in type thereto. The processor 102 may control at least one of the inverter 104 or the power transmission circuit 109 to transmit, e.g., the determined magnitude of power.

According to an embodiment, the power reception circuit 159 may wirelessly receive power as per at least one of an induction scheme, a resonance scheme, or an electromagnetic wave scheme from the power transmitting circuit 109. The power reception circuit 159 may include a resonance circuit with a designated resonance frequency. The power reception circuit 159 may include a coil. An induced electromagnetic force may be produced in the coil based on the magnetic field which varies over time. Thus, AC power may be output from the power reception circuit 159.

The rectification circuit 151 may rectify the AC power received from the power reception circuit 159 into DC power. The converter 154 may convert the voltage of the rectified DC power into a value appropriate for the charger 157. The external electronic device 150 may further include a power management integrated circuit (PMIC). The PMIC may receive power output from the converter 154, process the received power to be adequate for the hardware in the external electronic device 150, and transfer the processed power. The charger 157 may charge the battery 158 with the received power. The charger 157 may monitor the status of the battery 158, adjust at least one of the voltage or current of the power received from the converter 154 based on, at least, the status of the battery 158, and charge the battery 158.

The memory 105 and memory 156 may store instructions for performing the overall operation of the electronic device and the external electronic device 150. The communication circuit 103 may transmit, e.g., media data signals or information related to wireless power transmission/reception to the communication circuit 153. The memory 105 or the memory 156 may be implemented in various types, such as a read only memory (ROM), a random access memory (RAM), or a flash memory, but not limited in type thereto.

The sensor 160 may sense data for the ambient areas of the external electronic device 150, and the processor 152 may identify the position of the electronic device 100 from the ambient areas using the sensed data. The processor 152 may identify the position of obstacles in the ambient areas using the sensed data. The path guide 108 of the electronic device 100 may output various kinds of signals to allow the external electronic device 150 to identify the position of the electronic device 100 and to move the identified position. For example, the electronic device 100 may radiate IR light to a designated area. In this case, the sensor 160 may be implemented as an IR sensor, and the external electronic device 150 may control the driver 161 to move within the area where the IR light has been emitted. According to an embodiment, the electronic device 100 may not include the path guide 108. In such a case, the sensor 160 may include, e.g., a camera. The camera may capture or record still images or videos. According to an embodiment, the camera may include one or more lenses, an image sensor, an image signal processor, or a flash. The camera may include a three-dimensional (3D) camera which may be implemented as a stereoscopic camera. The processor 152 may identify the position of the electronic device 100 by analyzing the image obtained via the camera and may obtain a path to the electronic device 100. For example, the electronic device 100 may include a housing, and at least one emblem for use in image processing may be formed on an externally exposed surface of the housing. The processor 152 may control the driver 161 so that the properties (e.g., at least one of the size, position, or shape) of the at least one emblem in the image meets a designated condition and, accordingly, the external electronic device 150 may move towards the electronic device 100. For example, the sensor 160 may include a lidar. The sensor 160 may output laser pulses and receive the laser pulses reflected by an ambient object. The processor 152 may identify the shape and position of ambient features or objects of the external electronic device 150 based on the received laser pulse reflections. The processor 152 may identify the position of the electronic device 100 based on the identified shape and position of the ambient features or objects.

The driver 161 may move at least part of the external electronic device 150. For example, the driver 161 may move the external electronic device 150 from a first position to a second position. According to an embodiment, the external electronic device 150 may further include wheels, and the driver 161 may include a motor or actuator connected with the wheels. The processor 152 may control the driver 161 to rotate the wheels for the external electronic device 150 to move from the first position to the second position or to brake rotation of the wheels. For example, the processor 152 may control the driver 161 to rotate the wheels at a first angular speed at the time of departing from the first position and control the driver 161 to reduce the angular speed of the wheels as the external electronic device 150 approaches the second position. Upon determining that the external electronic device 150 arrives at the second position, the processor 152 may control the driver 161 to stop the wheels. According to an embodiment, the external electronic device 150 may include a plurality of legs, and the driver 161 may be connected to each of the plurality of legs and may include a motor or actuator for controlling the movement of the legs. The external electronic device 150 may include at least one propeller for flying, and the driver 161 may include a motor or actuator for rotating the at least one propeller. The driver 161 may include a motor or actuator for rotating the external electronic device 150. The external electronic device 150 may move near the electronic device 100 based on sensing data obtained via the sensor 160 and may rotate at the electronic device 100. The external electronic device 150 may rotate so that the coil in the external electronic device 150 may be aligned with the coil in the electronic device 100.

According to an embodiment, the electronic device 100 or the external electronic device 150 may further include various sensors, e.g., a proximity sensor and an ultrasonic sensor, and when the external electronic device 150 approaches the electronic device 100, path adjustment may be performed more delicately based on data from the sensors. In other words, the electronic device 100 or the external electronic device 150 may include a combination of a plurality of sensors. The external electronic device 150 may identify obstacles on the path based on sensing data obtained from the sensor 160 and may control the driver 161 to move while avoiding the obstacles.

Figure 3A:
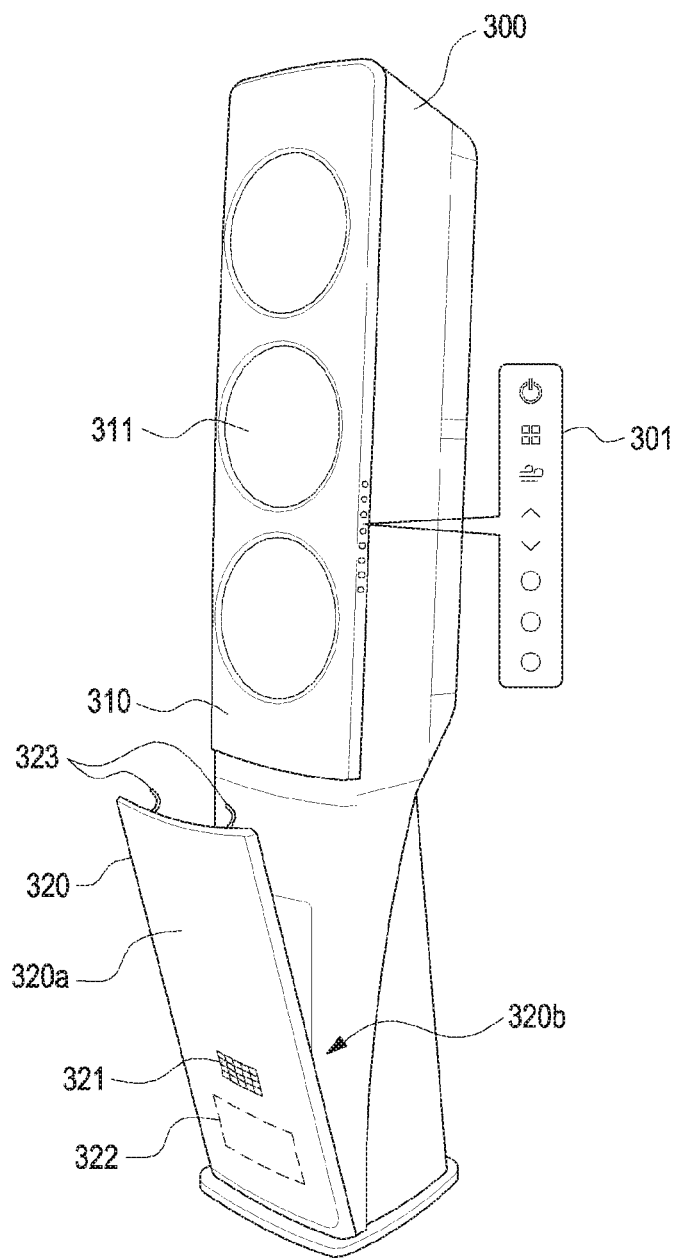
FIG. 3A is a view illustrating an electronic device and a host device, according to an embodiment.

FIG. 3A is a view illustrating an electronic device and a host device according to an embodiment.

Referring to FIG. 3A, a host device 300 may be implemented as a home appliance, e.g., an air conditioner. The host device 300 may be implemented as various other home appliances than an air conditioner, such as an air purifier, humidifier, a dehumidifier, a washer, a dryer, a toaster, a microwave, or fridge, without limitations. The host device 300 may include a first housing 310 and a second housing 320. The second housing 320 may be considered as the housing for an electronic device. The first housing 310 and the second housing 320 may contain the internal components of the host device 300 from the outside. The first housing 310 may include a vent hole 311 for ventilation and an input device 301 for controlling at least one function of the host device 300. The second housing 320 may include a first surface 320a exposed to the outside and a second surface 320b which is opposite to the first surface 320a. The second housing 320 may include a coupling means 323 for coupling with the first housing 310. Depending on the state of the coupling means 323, the second housing 320 may be coupled to, or decoupled from, the first housing 310. Although the coupling means 323 is shown as shaped as a ring couplable to at least part of the first housing 310 in the embodiment of FIG. 3A, this is merely an example, and it will be readily appreciated by one of ordinary skill in the art that the coupling means 323 is not limited in shape or way to couple thereto.

According to an embodiment, a path guide 321 (e.g., the path guide 108 of FIG. 2) may be disposed on the first surface 320a of the second housing 320. A wireless power transmission circuit of an electronic device 322 may be disposed on the second surface 320b of the second housing 320. The path guide 321 may emit a signal (e.g., an IR signal) to guide the external electronic device 150 to a path. The external electronic device 150 may sense the path guiding signal via the sensor 160 and move near the path guide 321 based on the sensing data. The path guide 321 may be included in the electronic device 322.

When coming on the market, the host device 300 typically comes with no hardware in its inner lower part as shown in FIG. 3A. Thus, the electronic device 322 may be disposed in the inner lower part of the host device, which has an empty space, and the path guide 321 may be disposed on the outer surface of the host device. Thus, maximized space use is rendered possible. In particular, as the electronic device 322 is placed inside a common home appliance, not on the path along which the user moves, more indoor space may be utilized.

According to an embodiment, the path guide 321 may output signals that may pass through the second housing 320. In this case, the path guide 321 may be disposed on the inner side of the second surface 320b of the second housing 320.

Figure 3B:
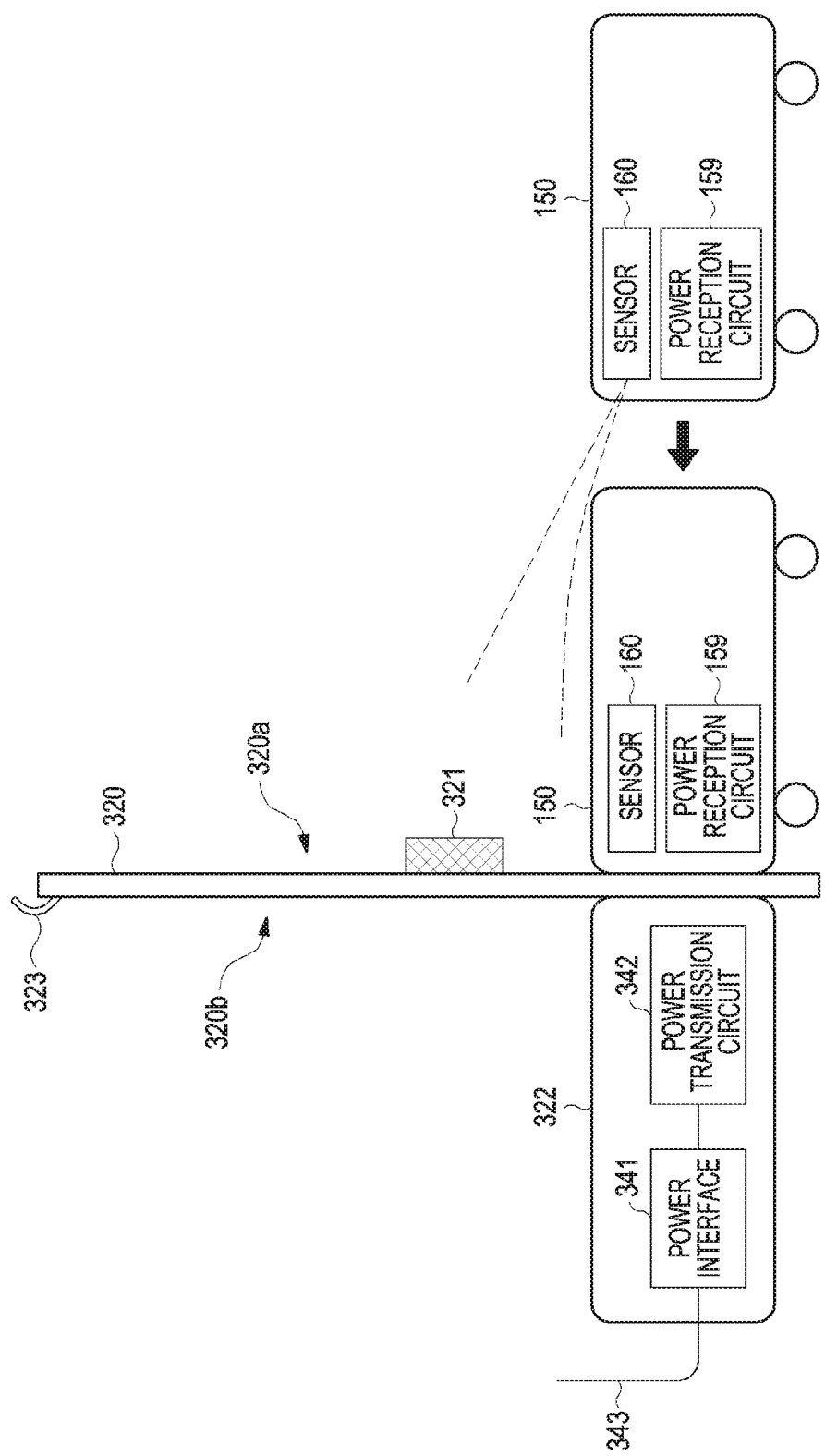
FIG. 3B is a cross-sectional view illustrating an electronic device and a host device according to an embodiment.

As shown in FIG. 3B, the external electronic device 150 may sense the path guide 321, or signals output from the path guide 321, via the sensor 160. For example, when the path guide 321 radiates IR light, the sensor 160 may sense the IR light. As moving with the area where IR light is radiated, the external electronic device 150 may approach the second housing 320 as shown in FIG. 3B.

The electronic device 322 may receive power from a host device (e.g., the host device 300) via the power interface 341. As shown in FIG. 3B, the electronic device 322 may be connected to the power supply of the host device via an electric line 343. Although the power interface 341 is shown to be directly connected to the power transmission circuit 342 for ease of description, according to an embodiment, it will readily be appreciated by one of ordinary skill in the art that the electronic device 322 may include various pieces of hardware or elements (e.g., an inverter or a DC/DC converter) for processing power as described above in connection with FIG. 2. Although the power interface 341 and the electric line 343 are shown to be different components, the electric line 343 may be included in the power interface 341. The power transmission circuit 342 may wirelessly transmit power using the received power. The power reception circuit 159 of the external electronic device 150 may wirelessly receive power from the power transmission circuit 342. For example, the position on the second surface 320b of the power transmission circuit 342 may be determined corresponding to the position of the power reception circuit 159 of the external electronic device 150. When the coil for wireless power transmission and the coil for wireless power reception are aligned with each other, wireless power transmission efficiency may be maximized. Thus, the position on the second surface 320b of the wireless power transmission coil may be determined so that the wireless power reception coil is aligned with the wireless power transmission coil when the external electronic device 150 contacts or approaches the second housing 320. Although FIG. 3B illustrates that the path guide 321 is positioned outside the electronic device 322, this simply indicates that the path guide 321 is physically positioned on the housing of the electronic device, and the path guide 321 may be electrically or operatively connected with the electronic device 322. In other words, the other components or elements of the electronic device 322 than the path guide 321 may be disposed in the main housing of the electronic device 322, and the path guide 321 may be disposed on the main housing of the electronic device 322 and be connected via the data line 361. The path guide 321 may also include a housing.

As shown in FIG. 3B, the second housing 320 may be manufactured as a structure that has the electronic device 322 and the path guide 321 formed on both surfaces thereof and may replace its corresponding housing of the conventional host device 300. In other words, the user may install the path guiding/wireless charging-capable structure on the conventional host device 300 simply by replacing the corresponding housing with the structure.

Figure 3C:
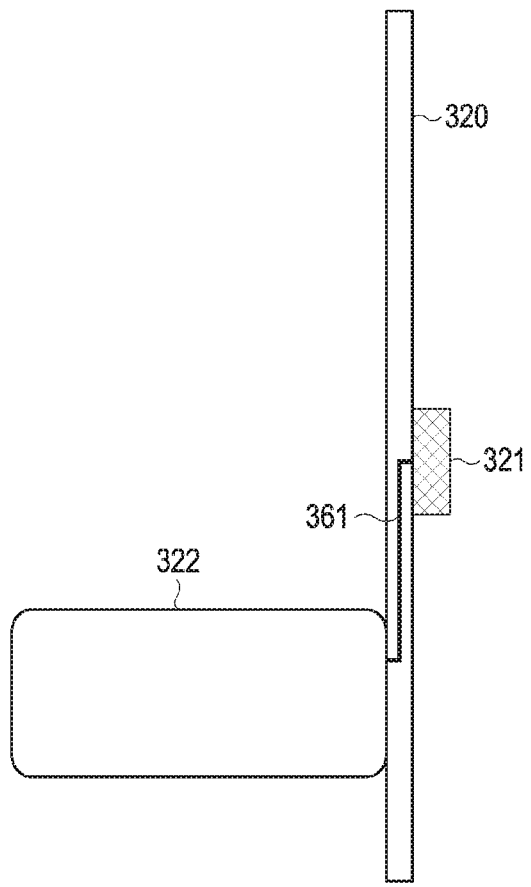
FIG. 3C is a view illustrating connections between a processor of an electronic device and a path guide, according to an embodiment.
Figure 3D:
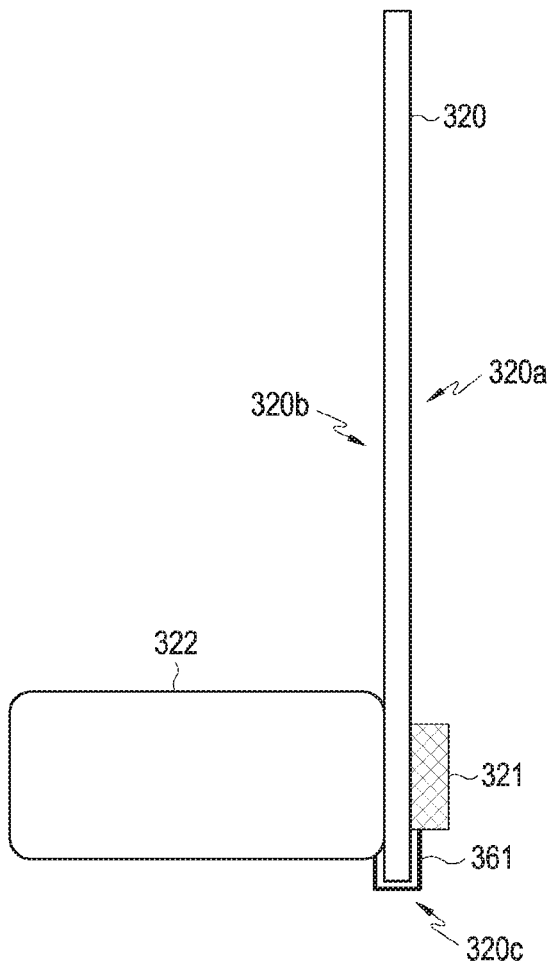
FIG. 3D is a view illustrating connections between a processor of an electronic device and a path guide, according to an embodiment.

FIG. 3C is a view illustrating connections between a processor of an electronic device and a path guide, according to an embodiment. FIG. 3D is a view illustrating connections between a processor of an electronic device and a path guide, according to an embodiment.

Referring to FIG. 3C, the path guide 321 and the processor (e.g., the processor 102) of the electronic device 322 may be connected together via the data line 361. The data line 361 may be implemented in various manners, e.g., as a bus, general-purpose input/output (GPIO), serial peripheral interface (SPI), or mobile industry processor interface (MIPI). In the embodiment of FIG. 3C, the data line 361 may be disposed to pass through the second housing 320. The second housing 320 may have a hole where the data line 361 may be disposed. The path guide 321 may receive a control signal from a processor of the electronic device 322 via the data line 361 and may operate based on the received control signal. For example, the processor of the electronic device 322 may identify that a designated condition for charging the external electronic device 150 is met. For example, the electronic device 322 may receive information for remaining battery power from the external electronic device 150 and, upon identifying that the remaining battery power falls within a designated range (e.g., a designated value or less), identify that the designated condition for charging is met. Alternatively, upon identifying that a task (e.g., cleanup) being performed by the external electronic device 150 is done, the electronic device 322 may identify that the designated condition for charging is met. When the designated condition is identified to be met, the processor of the electronic device 322 may transmit a control signal to perform path guiding through the data line 361 to the path guide 321. The path guide 321 may perform path guiding based on the received control signal.

Alternatively, as shown in FIG. 3D, the data line 361 may be disposed on a third surface 320c that connects the first surface 320a and the second surface 320b. There may be a space between the third surface 320c and a lower housing of the host device to support the second housing 320, and the data line 361 may extend through the space from the inside of the second housing 320 to the outside of the second housing 320.

Alternatively, the path guiding 322 may include no path guide. In this case, the external electronic device 150 may move near the path guiding 322, e.g., near the power transmission coil of the path guiding 322, based on a captured image of the external view. Or, the external electronic device 150 may move near the electronic device 322, e.g., near the power transmission coil of the path guiding 322, based on an indoor map identified via lidar. An emblem, instead of the path guide 321, may be formed on the first surface 320a of the second housing 320. For example, the emblem may have at least one of a predesignated shape or size, and the external electronic device 150 may detect the emblem from the captured image and move so that a property of the detected emblem meets a designated condition. In the case where the emblem is formed on the first surface 320a of the second housing 320, no data line may be provided.

It will readily be appreciated by one of ordinary skill in the art that a power line for providing power to operate the path guide 321 may be provided along with the data line 361 in the embodiment of FIGS. 3C and 3D. According to an embodiment, such an implementation may also be possible that data and power both may be transmitted and received via a single line.

Figure 4:
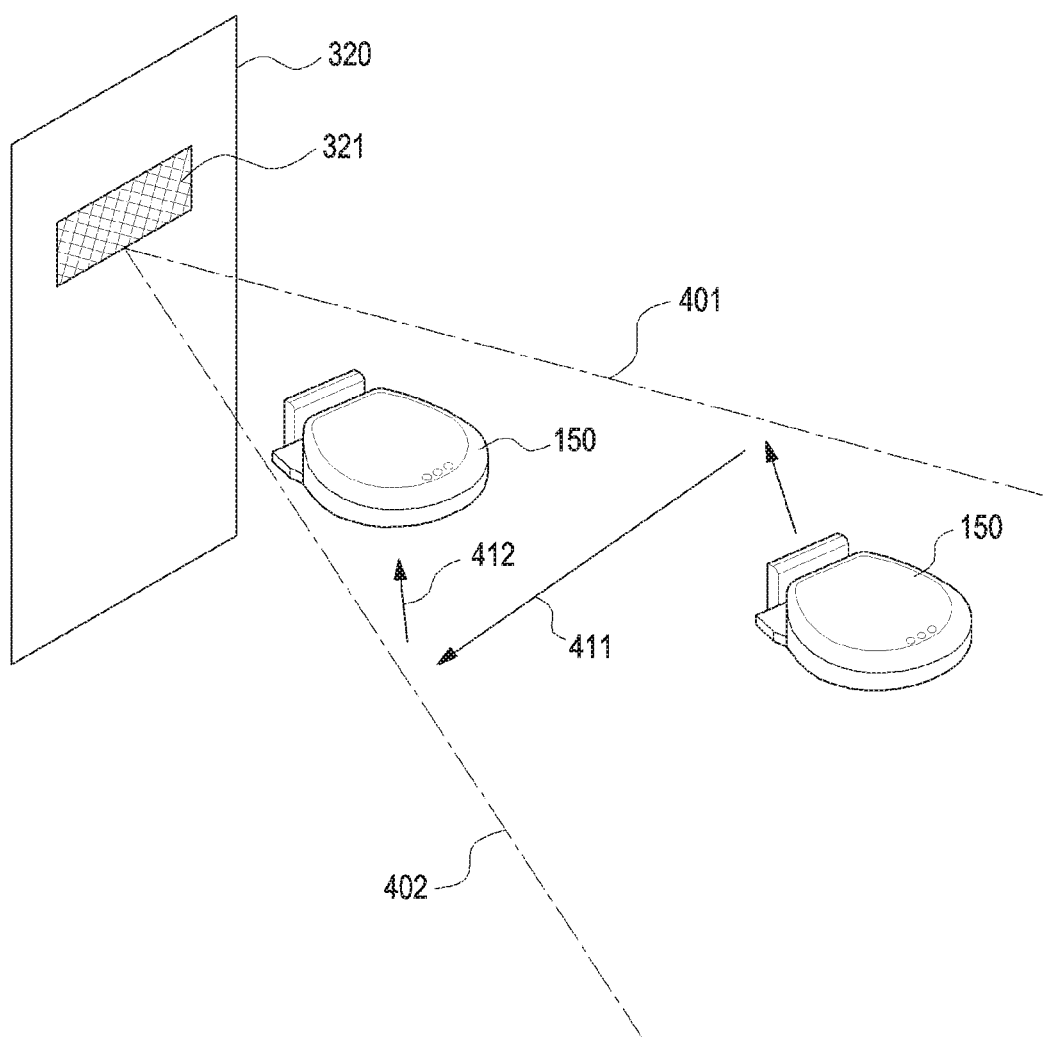
FIG. 4 is a view illustrating movement of an external electronic device, according to an embodiment.

FIG. 4 is a view illustrating movement of an external electronic device, according to an embodiment.

In the embodiment of FIG. 4, the path guide 321 may radiate IR light under a designated condition. For example, the path guide 321 may radiate IR light in an area between a first border line 401 and a second border line 402. The path guide 321 may have at least one light emitting device to radiate IR light in the area between the first border line 401 and the second border line 402. The path guide 321 may turn on the at least one light emitting device immediately without calculation for a radiation condition, thereby radiating IR light in the area between the first border line 401 and the second border line 402.

According to an embodiment, the external electronic device 150 may include an IR sensor. The external electronic device 150 may identify whether IR light is detected based on sensing data obtained via the IR sensor. For example, the external electronic device 150 may detect IR light in the area between the first border line 401 and the second border line 402 but not out of the area between the first border line 401 and the second border line 402. Detecting IR light here may mean that a designated threshold amount of, or more, IR light is detected in the wavelength band of the IR light radiated from the path guide 321.

According to an embodiment, the external electronic device 150 may move (411 and 412) within the area where IR light is detectable. For example, the external electronic device 150 may move while IR light is detected and be positioned near the first border line 401. As set forth above, the amount of light in a particular wavelength band may be the threshold amount or more inside of the first border line 401, and the amount of light in the particular wavelength band may be less than the threshold amount out of the first border line 401. The external electronic device 150 may measure the amount of light in the particular wavelength band while on the move. The external electronic device 150 may identify that the amount of light in the particular wavelength band becomes the threshold amount and may change the path based thereupon. For example, the external electronic device 150 may move (411) to the path first changed. The external electronic device 150 may move while maintaining the state of the amount of light in the particular wavelength band being the threshold light amount. Moving while maintaining the state of the amount of light in the particular wavelength band being the threshold light amount may mean moving within the area between the first border line 401 and the second border line 402. The external electronic device 150 may move (411) on the first-changed path and approach near the second border line 402. The external electronic device 150 may identify that the amount of light in the particular wavelength band reduces up to the threshold near the second border line 402. The external electronic device 150 may move (412) to the path second changed based thereupon. Thus, the external electronic device 150 may move while changing the path in the area between the first border line 401 and the second border line 402 and may finally move near the second housing 320 in which the electronic device 322 is positioned. According to an embodiment, when the external electronic device 150 arrives at the final position of the external electronic device 150, the path guide 321 may transmit a signal for path guiding to allow the power reception coil in the external electronic device 150 to be aligned with the power transmission coil in the electronic device 322. Meanwhile, the above-described IR-based path guiding is merely an example, and it will readily be appreciated by one of ordinary skill in the art that other various operations for path guiding a moving body, e.g., a robot, may apply likewise.

Figure 5A:
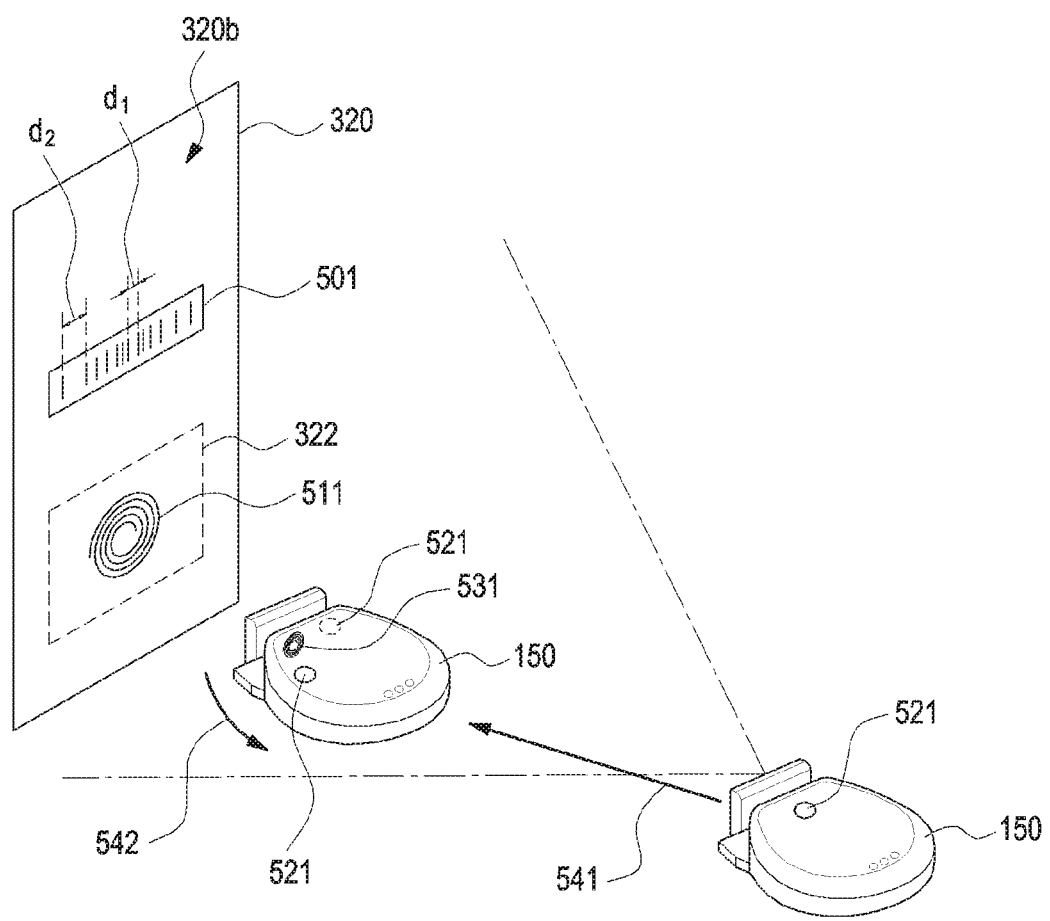
FIG. 5A is a view illustrating movement of an external electronic device, according to an embodiment.

FIG. 5A is a view illustrating movement of an external electronic device, according to an embodiment.

In the embodiment of FIG. 5A, the electronic device 322 may include no path guide. An emblem 501 may be formed on the second surface 320b of the second housing 320. In other words, the emblem 501 may be exposed on the outer surface of the second housing 320, and an electronic device 322 may be disposed on the inner surface of the second housing 320. The electronic device 322 may include the power transmission coil 511. For example, as shown in FIG. 5A, the emblem 501 (e.g., barcode) may be shaped to have a plurality of bars, and intervals d1 and d2 between the plurality of bars may differ. The position of the emblem 501 may be determined to be a position which may be sensed by a sensor 521 (e.g., a camera) of the external electronic device 150.

According to an embodiment, the external electronic device 150 may move (541) and/or rotate (521) based on sensing data (e.g., a captured image of the external view) obtained via the sensor 521. For example, the external electronic device 150 may detect the object corresponding to the emblem 501 in the captured image of the external view. The external electronic device 150 may move and/or rotate until the object corresponding to the emblem 501 meets a predesignated condition. Thus, the external electronic device 150 may move and/or rotate a position appropriate for charging. For example, the external electronic device 150 may move and/or rotate until the power reception coil 531 in the external electronic device 150 is aligned with the power transmission coil 511. According to an embodiment, after moving, the external electronic device 150 may rotate, or after rotating, the external electronic device 150 may move. Alternatively, the external electronic device 150 may move and rotate at the same time.

Figure 5B:
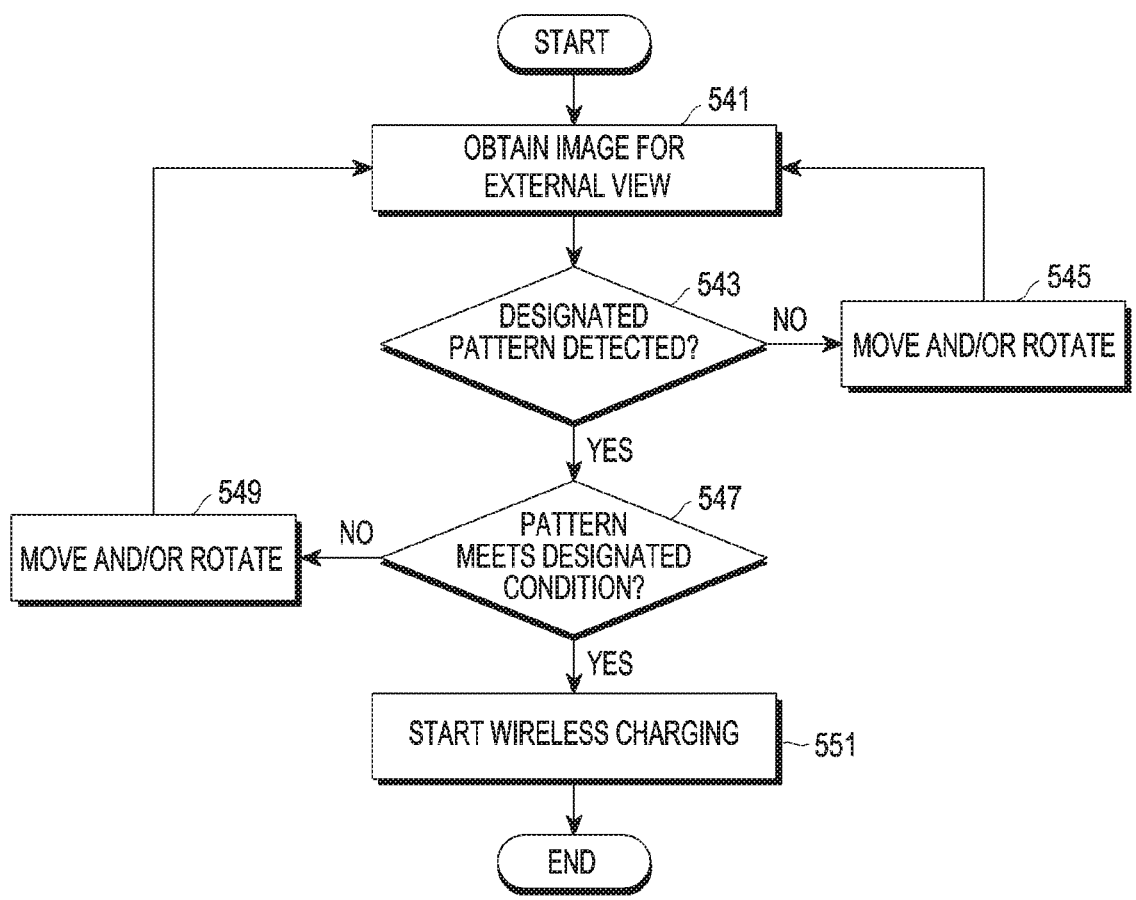
FIG. 5B is a flowchart illustrating a method for operating an external electronic device, according to an embodiment.
Figure 5C:
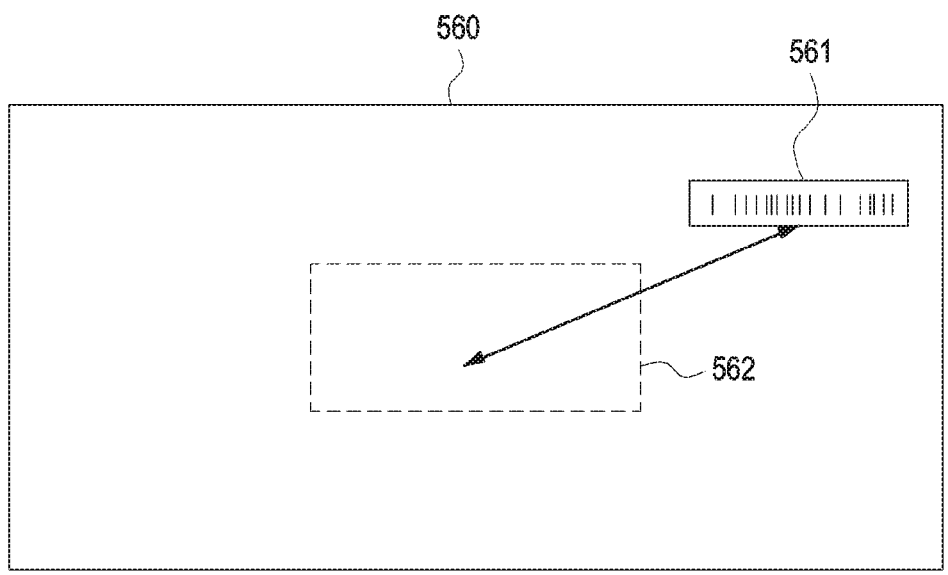
FIG. 5C is a view illustrating an image captured by an external electronic device, according to an embodiment.

FIG. 5B is a flowchart illustrating a method for operating an external electronic device, according to an embodiment. An embodiment of FIG. 5B is described in greater detail with reference to FIG. 5C. FIG. 5C is a view illustrating an image captured by an external electronic device, according to an embodiment.

According to an embodiment, in operation 541, the external electronic device 150 may obtain an image for the external view. "The external electronic device 101 performs a particular operation" may mean, e.g., that the processor 102 of the external electronic device 150 performs the particular operation or controls another hardware component to perform the particular operation. "The external electronic device 150 performs a particular operation" may mean that, as at least one instruction stored in the memory 105 of the external electronic device 150 is executed, the processor 102 performs the particular process or controls another hardware component to perform the particular operation.

In operation 543, the external electronic device 150 may identify whether a designated pattern is detected from the obtained image. The designated pattern may be a pattern included in, e.g., the emblem 501 of FIG. 5A. When the pattern is not detected, the external electronic device 150 may move and/or rotate in operation 545. As moving and/or rotating, the external electronic device 150 may move and/or be oriented to the position where it may capture the emblem 501.

Upon identifying that the designated pattern is detected, the external electronic device 150 may identify whether the pattern meets a designated condition in operation 547. For example, the external electronic device 150 may obtain an image 560 as shown in FIG. 5C. The designated pattern 561 may be included in the image 560 of FIG. 5C. The external electronic device 150 may previously store property information for a reference object 562 of the designated pattern 561. The external electronic device 150 may store information for at least one of the position, size, or shape of the reference object 562. When the pattern does not meet the designated condition, the external electronic device 150 may perform at least one of moving or rotating based on at least one of the position, shape, or size of the detected pattern in operation 549. For example, the external electronic device 150 may store information for the correlation between at least one of the position, shape, or size of the detected pattern and control information for at least one actuator in the external electronic device 150. The external electronic device 150 may control the operation of the at least one actuator by comparing the correlation information with at least one of the position, shape, or size of the detected pattern. Thus, the external electronic device 150 may perform at least one of moving or rotating so that at least one of the position, shape, or size of the detected pattern corresponds to at least one of the position, shape, or size of the reference object 562. For example, as the intervals d1 and d2 between the plurality of bars constituting the pattern differ from each other as shown in FIG. 5A, the external electronic device 150 may perform at least one of moving or rotating so that the power reception coil of the external electronic device 150 is aligned with the power transmission coil of the electronic device 322. When the pattern meets the designated condition, the external electronic device 150 may start wireless charging.

Figure 6A:
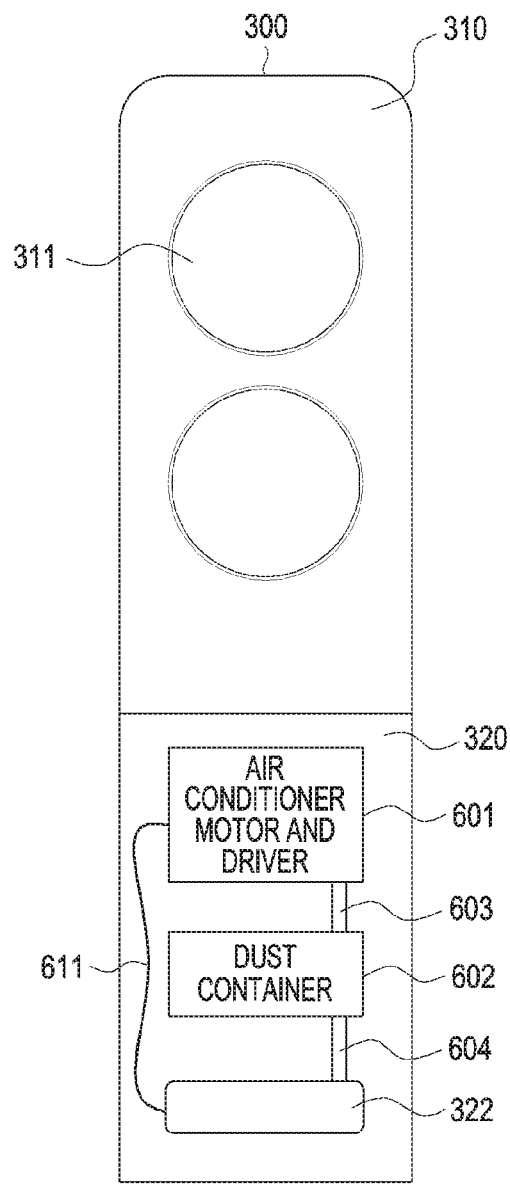
FIG. 6A illustrates a front perspective view and a side perspective view of a host device, an electronic device, and an external electronic device, according to an embodiment.
Figure 6B:
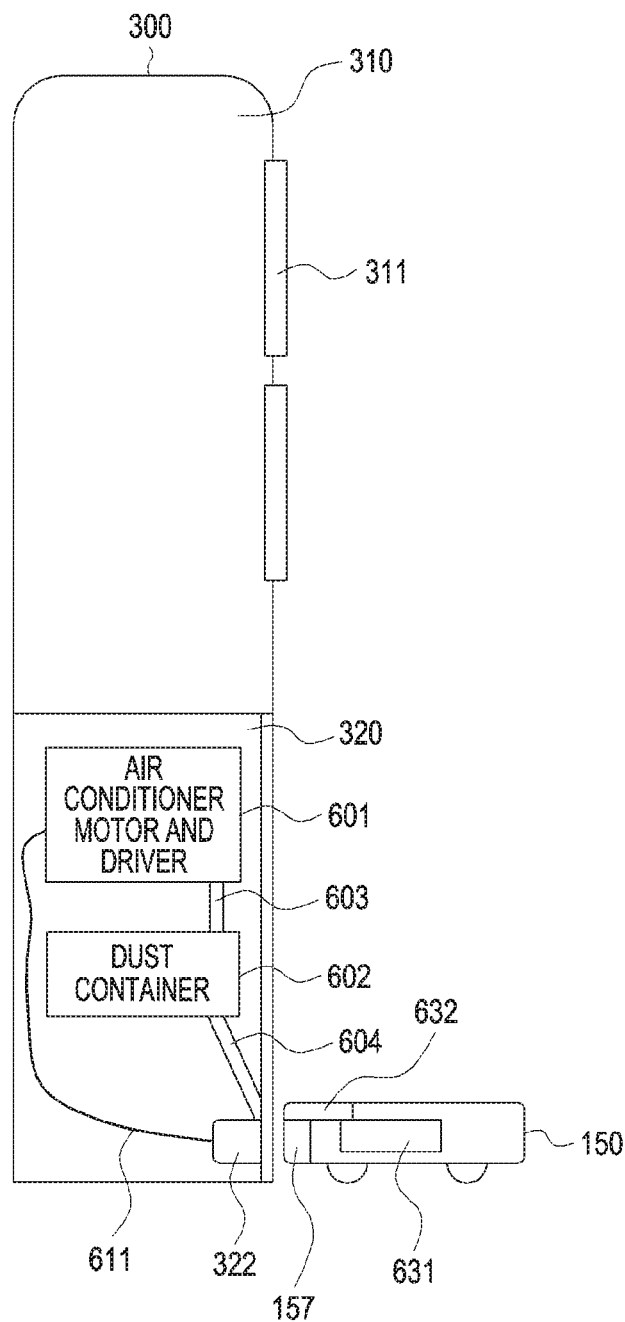
FIG. 6B illustrates a front perspective view and a side perspective view of a host device, an electronic device, and an external electronic device, according to an embodiment.

FIG. 6A illustrates a front perspective view and a side perspective view, respectively, of a host device, an electronic device, and an external electronic device according to an embodiment. FIG. 6B illustrates a front perspective view and a side perspective view, respectively, of a host device, an electronic device, and an external electronic device according to an embodiment.

Referring to FIGS. 6A and 6B, a host device 300 (e.g., an air conditioner) may include a first housing 310 and a second housing 320. The second housing 320 may be considered as the housing for an electronic device 322. An air conditioner motor and driver 601, a dust container 602, and an electronic device 322 may be arranged in the second housing 320.

The air conditioner motor and driver 601 may include at least one motor to blow air out via the vent hole 311 of the host device 300. The at least one motor may be connected with an additional driving hardware component to blow air. Further, the air conditioner motor and driver 601 may include a power supply to supply power required for driving the host device 300. The power supply may receive power from, e.g., an external power source (e.g., a power outlet installed on the wall in the home), convert the received power into DC power using various hardware components in the host device 300, and output the DC power.

As described above, the electronic device 322 may receive power from the power supply included in the air conditioner motor and driver 601. The electronic device 322 may receive power from the power supply through an electric line 611. Alternatively, the electronic device 322 may directly receive power from the power outlet.

According to an embodiment, a pipe 603 through which air enters or exits may connect the air conditioner motor and driver 601 and the dust container 602. Dust in the air entered through the vent hole 311 may be collected in the dust container 602. The host device 300 may include at least one filter to filter the air. The dust filtered by the at least one filter may be discharged to the dust container 602. In this case, dust may be delivered through the pipe 603 or another pipe to the dust container 602. The dust container 602 may be connected to a dust container 631 of the external electronic device 150 via a pipe 604. The external electronic device 150 may include the dust container 631 and a power reception circuit 157 and may further include a pipe 632 to connect the dust container 631 to the pipe 604 of the host device 300. The external electronic device 150 may be implemented as, e.g., a robot vacuum, and may suck up dust on the floor. The external electronic device 150 may collect the sucked-in dust in the dust container 631.

When the external electronic device 150 arrives at a designated position for wirelessly receiving power, the pipe 604 of the host device 300 and the pipe 632 of the external electronic device 150 may connect together. Thus, the dust container 602 of the host device 300 and the dust container 631 of the external electronic device 150 may connect together via the pipes 604 and 632. According to an embodiment, upon identifying that the electronic device 150 arrives at the designated position, the host device 300 may perform control to deliver dust from the dust container 631 of the external electronic device 150 to the dust container 602. For example, the host device 300 may discharge the air in the dust container 602 to the outside of the dust container 602 via the pipe 603 to decrease the air pressure in the dust container 602. Thus, the air pressure in the dust container 602 of the host device 300 may be lowered to a first air pressure. Meanwhile, the air pressure in the dust container 631 of the external electronic device 150 may be a second air pressure which may be higher than the first air pressure. Thus, dust in the dust container 631 of the external electronic device 150 may be rendered to move to the dust container 602 of the host device 300. Without the user's need for manually emptying the dust container 602 of the external electronic device 150, dust in the dust container 631 of the external electronic device 150 may be automatically delivered to the dust container 602 of the host device 300. According to an embodiment, the external electronic device 150 may normally keep the pipe 632 closed and, upon detecting a dust discharge event, open the pipe 632. For example, the external electronic device 150 may open the pipe 632 using the start of wireless charging as trigger. The external electronic device 150 may receive a pipe open signal via communication for wireless charging and, upon receiving the pipe open signal, open the pipe 632.

Figure 7A:
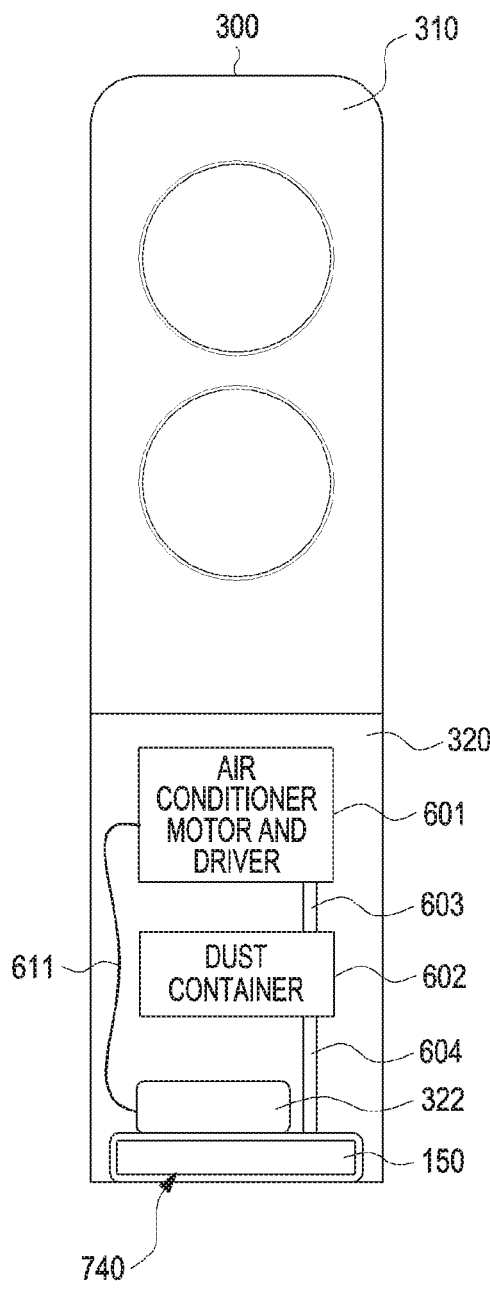
FIG. 7A is a view illustrating a front perspective view and a side perspective view of a host device, an electronic device, and an external electronic device, according to an embodiment.
Figure 7B:
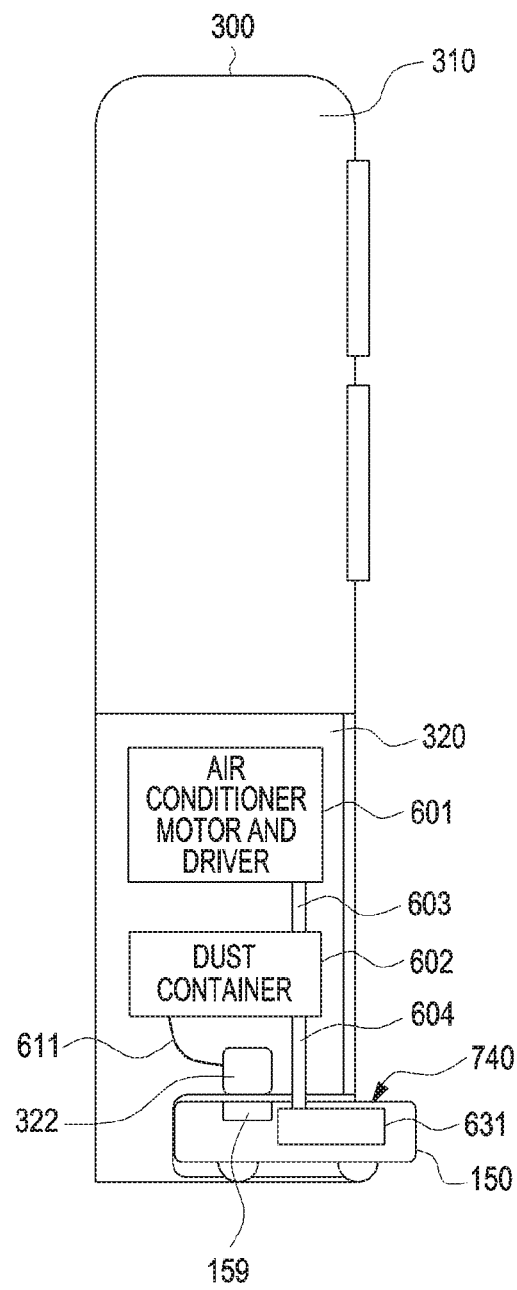
FIG. 7B is a view illustrating a front perspective view and a side perspective view of a host device, an electronic device, and an external electronic device, according to an embodiment.

FIG. 7A is a view illustrating a front perspective view and a side perspective view, respectively, of a host device, an electronic device, and an external electronic device according to an embodiment. FIG. 7B is a view illustrating a front perspective view and a side perspective view, respectively, of a host device, an electronic device, and an external electronic device according to an embodiment.

Referring to FIGS. 7A and 7B, according to an embodiment, the host device 300 may have a hole 740 for receiving the external electronic device 150. The hole 740 may be formed to be larger in size than at least one surface of the external electronic device 150 so that the electronic device 150 enters the hole 740. The electronic device 322 may be disposed to be substantially adjacent to the surface with the hole 740. The external electronic device 150 may be configured to enter the hole 740 based on sensing data identified via the sensor. The external electronic device 150 may move near the hole 740 based on, e.g., a path guiding signal output from the host device 300 or a captured image for the outside of the host device 300. The external electronic device 150 may be configured to enter the hole 740 without stopping after moving near the hole 740. If stopped by the wall of the hole 740, the external electronic device 150 may stop the operation of the driver.

Figure 7C:
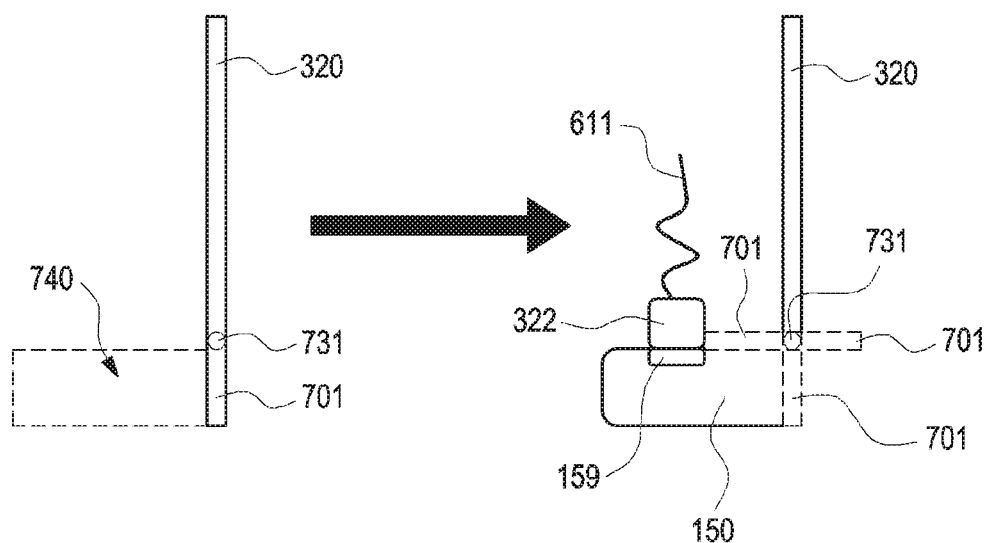
FIG. 7C is a cross-sectional view illustrating an example of opening/closing a door, according to an embodiment.

In an embodiment of FIG. 7C, the host device 300 may include a door 701 to open/close the hole 740. The host device 300 may have a hinge 731 to change the positioning angle of the door 701. The positioning angle of the door 701 may be varied as the hinge 731 rotates, allowing the external electronic device 150 to enter the hole 740. In its normal position, the door 701 may close the hole 740. The structure of the hinge 731 is merely an example, and any other various structures may also be adopted for opening or closing the door 701, which will be apparent to one of ordinary skill in the art.

Figure 8A:
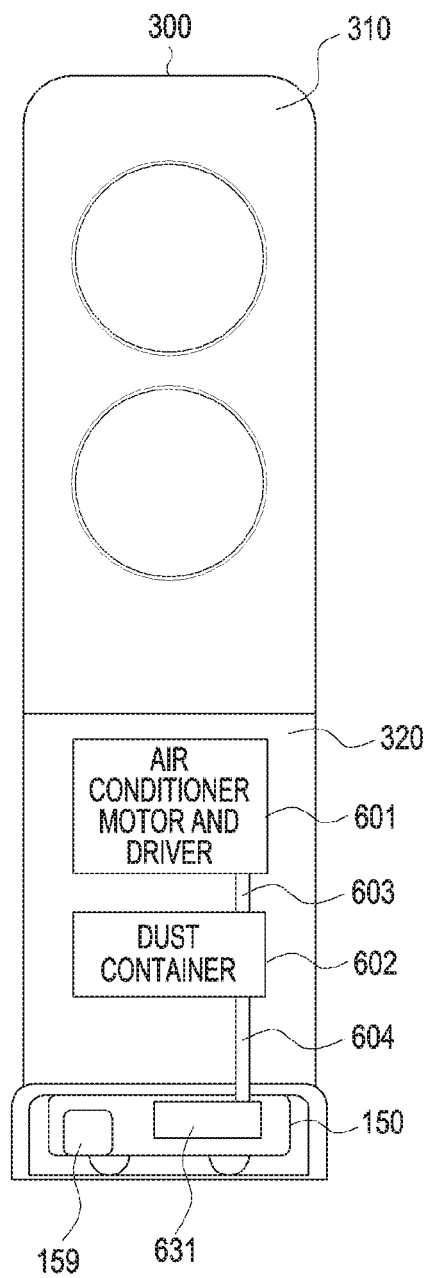
FIG. 8A is a view illustrating a front perspective view and a side perspective view of a host device, an electronic device, and an external electronic device, according to an embodiment.
Figure 8B:
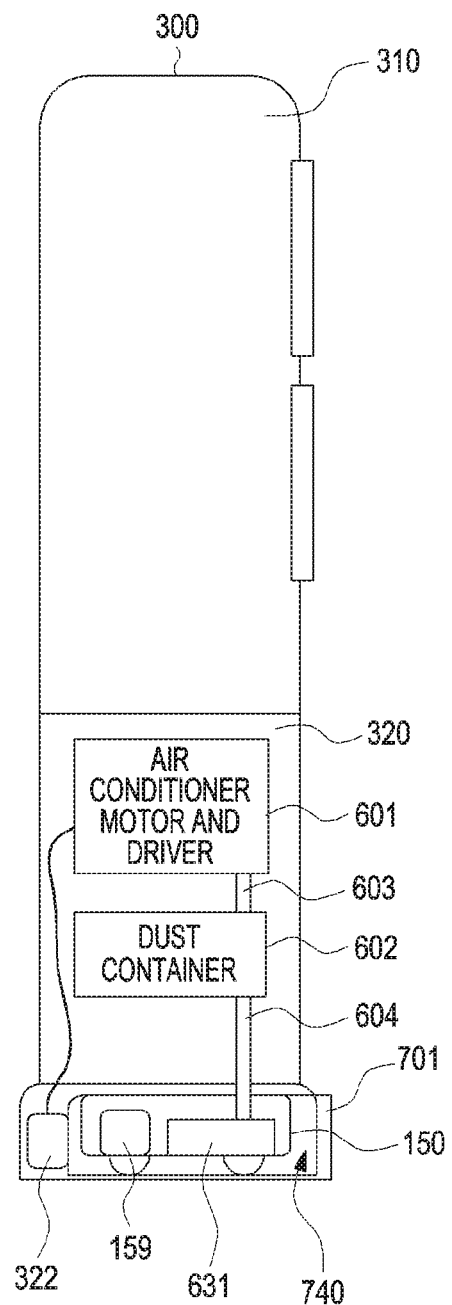
FIG. 8B is a view illustrating a front perspective view and a side perspective view of a host device, an electronic device, and an external electronic device, according to an embodiment.

FIG. 8A is a view illustrating a front perspective view and a side perspective view, respectively, of a host device, an electronic device, and an external electronic device according to an embodiment. FIG. 8B is a view illustrating a front perspective view and a side perspective view, respectively, of a host device, an electronic device, and an external electronic device according to an embodiment.

In an embodiment of FIGS. 8A and 8B, the host device 300 may include a door 701 to open/close the hole 740. While in an embodiment of FIGS. 7A and 7B, the electronic device 322 is disposed to be substantially adjacent to the top surface of the hole 740, the electronic device 322 in an embodiment of FIGS. 8A and 8B may be disposed to be substantially adjacent to a side surface of the hole 740. In this case, the position of the electronic device 322 in the external electronic device 150 may be determined to be adjacent to a side surface of the external electronic device 150 so that after entering the hole 740, the power reception circuit 159 may substantially approach the electronic device 322. The electronic device 322 may be placed in various positions depending on the position of the power reception coil in the external electronic device 150. Although FIGS. 7A, 7B, 8A, and 8B illustrate that the hole 740 is position substantially inside the host device 300, this is merely an example, and the host device 300 may include such a structure as to expose a tray including the hole 740 to the outside. In such case, the tray may be positioned inside the host device 300 normally but, upon detecting approach of the external electronic device 150, the tray may be controlled to be exposed. Such a structure is also possible in which the tray with the hole 740 remains exposed all the time.

Figure 9:
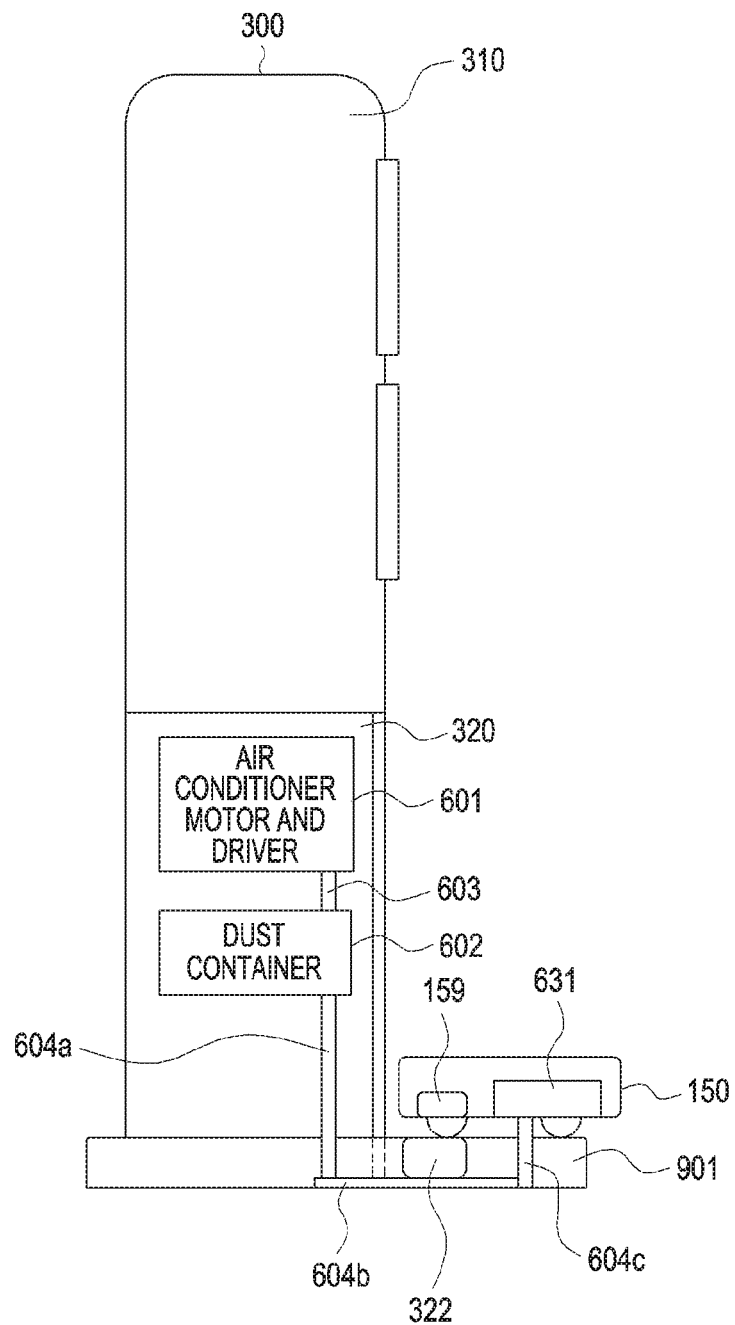
FIG. 9 is a view illustrating an external electronic device, an electronic device, and an external electronic device according to an embodiment.

FIG. 9 is a view illustrating a host device, an electronic device, and an external electronic device, according to an embodiment.

Referring to FIG. 9, the host device 300 may include a bottom tray 901. According to an embodiment, the bottom tray 901 may be disposed to remain exposed to the outside of the host device 300. Alternatively, the bottom tray 901 may be positioned inside the host device 300 and, as the external electronic device 150 approaches nearby, the bottom tray 901 may be exposed to the outside. The host device 300, upon detecting approach of the electronic device 150, may control at least one actuator to expose the bottom tray 901. The host device 300 may include an actuator for adjusting the position of the bottom tray 901 and at least one connecting means. The bottom tray 901 may include sub pipes 604a, 604b, and 604c. At least one of the sub pipes 604a, 604b, and 604c may have a structure or material whose length is varied as the bottom tray 901 is exposed. For example, if the bottom tray 901 is positioned inside the host device 300, at least one of the sub pipes 604*a*, 604*b*, and 604*c* may be shortened. If the bottom tray 901 is exposed to the outside of the host device 300, at least one of the sub pipes 604*a*, 604*b*, and 604*c* may be shortened. The sub pipe 604*c* connected with the dust container 631 of the external electronic device 150 may be left with a reduced length to be positioned inside the bottom tray 901 before the external electronic device 150 approaches. Meanwhile, according to an embodiment, the bottom tray 901 may be part of the electronic device 322. The electronic device 322 may include the bottom tray 901 itself or may be configured to output a control signal for controlling the position of the bottom tray 901. The bottom tray 901 may project forwards or flip down to the floor, thereby allowing itself to be exposed to the outside. The bottom tray 901 is not limited to a specific size and, as an example, the bottom tray 901 may be formed to be larger in size than the bottom of the host device 300. According to an embodiment, at least one of the sub pipes 604*a*, 604*b*, and 604*c* may be formed of a soft material which may be transformed even without length adjustment, thus maintaining the connection between the dust containers 602 and 631 when the bottom tray 901 enters or exits.

Figure 10:
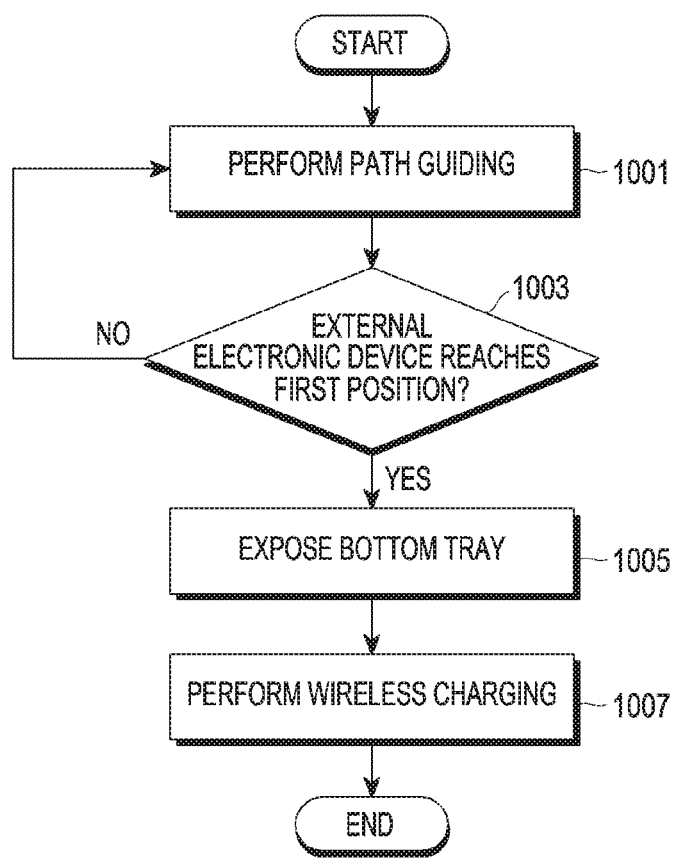
FIG. 10 is a flowchart illustrating a method for operating an electronic device according to an embodiment.

FIG. 10 is a flowchart illustrating a method for operating an electronic device, according to an embodiment.

According to an embodiment, in operation 1001, the electronic device 322 may perform path guiding. As set forth above, the electronic device 322 may perform path guiding in various manners, e.g., by radiating IR light. The external electronic device 150 may sense a signal according to the path guiding, and the external electronic device 150 may move to a designated first position for wireless charging based on the sensing data. Further, the external electronic device 150 may rotate in a designated first direction for wireless charging. Alternatively, the electronic device 322 may include no path guide. In such a case, operation 1001 may be omitted, and the external electronic device 150 may move to the designated first position for wireless charging based on data obtained by sensing the outside (e.g., a captured image for the external view).

In operation 1003, the electronic device 322 may identify whether the external electronic device 150 arrives at the first position. The electronic device 322 may identify whether the external electronic device 150 arrives at the first position via various sensors. For example, the electronic device 322 may include a proximity sensor to identify whether an object is in the first position and may identify whether the external electronic device 150 arrives at the first position based on sensing data from the proximity sensor. The electronic device 322 may include a camera for capturing the external view and identify whether the external electronic device 150 arrives at the first position based on a result of processing the image obtained by the camera. As set forth above, the external electronic device 150 itself may identify whether it arrives at the first position. The external electronic device 150 may transmit a communication signal indicating whether the external electronic device 150 arrives at the first position to the electronic device 322. The electronic device 322 may identify whether the external electronic device 150 arrives at the first position based on the communication signal received from the external electronic device 150. The above-described scheme for identifying whether the external electronic device 150 arrives at the first position is merely an example, and how to identify whether the external electronic device 150 arrives at the first position is not limited thereto.

Upon identifying that the external electronic device 150 has not yet arrived at the first position, the electronic device 322 may continue performing path guiding. Upon identifying that the external electronic device 150 arrives at the first position, the electronic device 322 may expose the bottom tray in operation 1005. As described above, the bottom tray may include a wireless power transmission circuit, e.g., a power transmission coil. In operation 1007, the electronic device 322 may perform wireless charging.

Figure 11A:
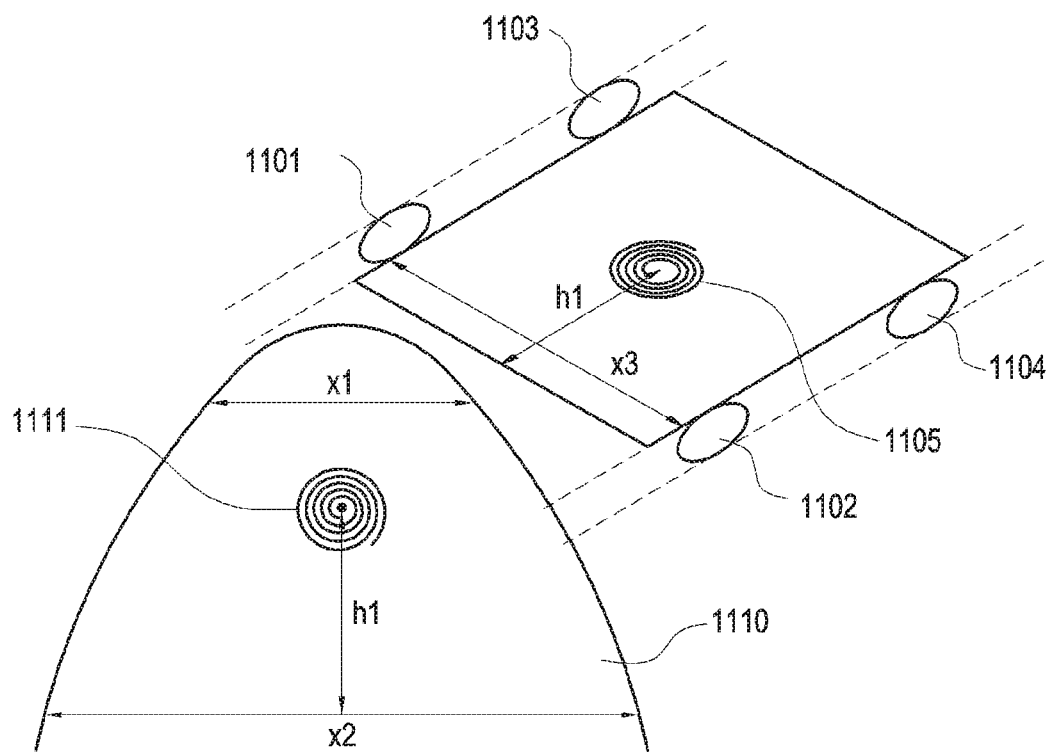
FIG. 11A is a view illustrating a bottom tray and a host electronic device, according to an embodiment.
Figure 11B:
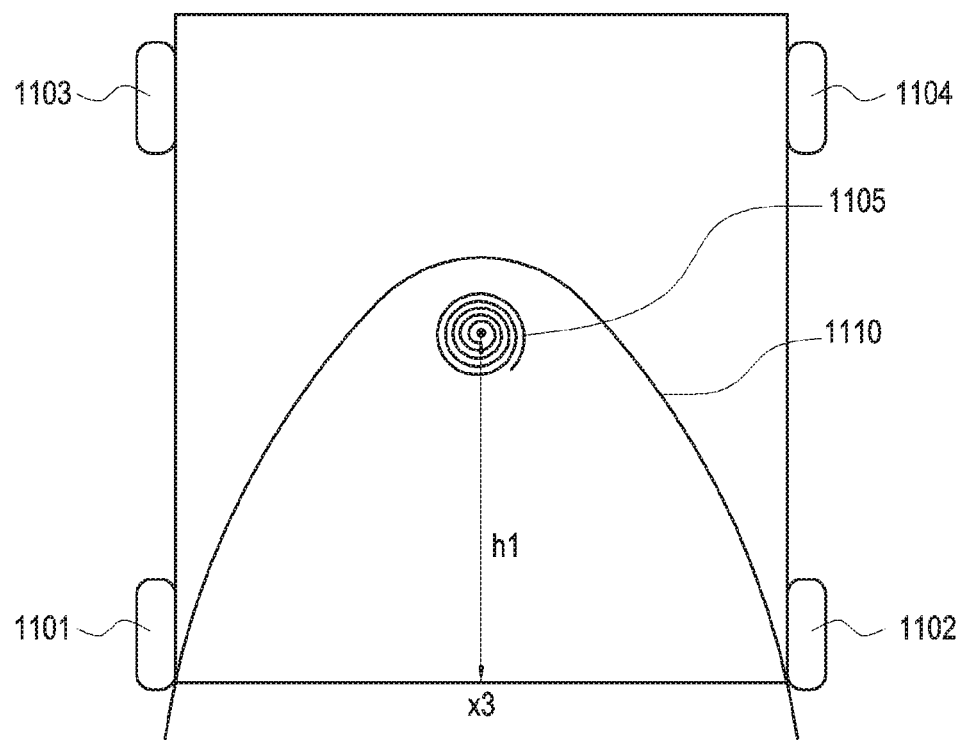
FIG. 11B is a view illustrating a bottom tray and a host electronic device, according to an embodiment.

FIG. 11A is a view illustrating a bottom tray and an external electronic device according to an embodiment. FIG. 11B is a view illustrating a bottom tray and an external electronic device according to an embodiment.

Referring to FIG. 11A, a bottom tray 1110 may be shaped so that its lower width x2 is larger than its upper width x1. Although FIG. 11A illustrates that the bottom tray 1110 is shaped as a parabola, this is merely an example. Without limitations, the bottom tray 1110 may have any other various shapes with the lower width x2 being larger than the upper width x1. The lower width x2 may be substantially the same as, e.g., the distance x3 between the left wheel 1101 or 1103 of the external electronic device 150 and the right wheel 1102 or 1104. The upper width x1 of the bottom tray 1110 is smaller than the distance x3 between the left wheel 1101 or 1103 of the external electronic device 150 and the right wheel 1102 or 1104, so that the external electronic device 150 may enter the bottom tray 1110. For example, the external electronic device 150 may enter towards the bottom tray 1110 in a direction different from the direction along which the bottom tray 1110 is formed, i.e., in an unaligned direction. Even so, the distance x3 between the left wheel 1101 or 1103 of the external electronic device 150 and the right wheel 1102 or 1104 is larger than the upper width x1 of the bottom tray 1110 and, thus, the electronic device 150 may enter the bottom tray 1110. After entering the bottom tray 1110, the external electronic device 150 may change its moving direction depending on the shape of the bottom tray 1110. Thus, as shown in FIG. 11B, the external electronic device 150 may move until the front wheels 1101 and 1102 are adjacent to the bottom tray 1110. Thus, the power transmission coil 1111 may be aligned with the power reception coil 1105. The power transmission coil 1111 may be positioned h1 away from the point corresponding to the lower width x2 of the bottom tray 1110. The power reception coil 1105 may be positioned h1 away from the virtual line between the front wheels 1101 and 1102. Thus, as shown in FIG. 11B, the wireless power reception coil 1105 may be aligned with the wireless power transmission coil 1111 in the bottom tray 1110. As shown in FIGS. 11A and 11B, the bottom tray 1110 may be exposed before the external electronic device 150 approaches the position set for wireless charging.

Further, the bottom tray 1110 may be shaped so that the lower width x2 is not larger than the upper width x1, and the shape of the bottom tray 1110 is not limited to a specific one.

Figure 12:
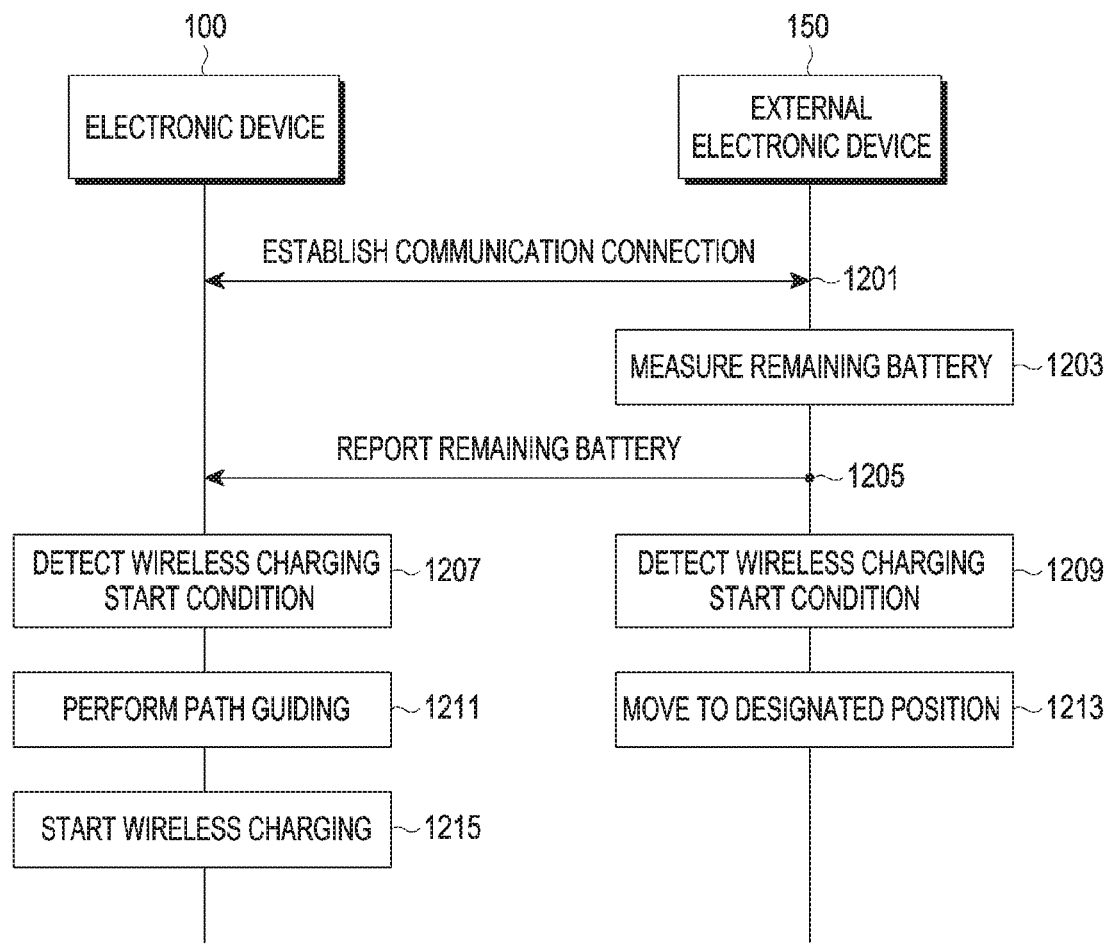
FIG. 12 is a flowchart illustrating operations of an electronic device and an external electronic device, according to an embodiment.

FIG. 12 is a flowchart illustrating operations of an electronic device and an external electronic device, according to an embodiment.

Referring to FIG. 12, in operation 1201, the electronic device 100 and the external electronic device 150 may establish a communication connection. For example, the electronic device 100 and the external electronic device 150 may establish a communication connection based on various short-range communication schemes. The external electronic device 150 may perform a given task (e.g., floor vacuuming).

In operation 1203, the external electronic device 150 may measure the remaining battery power. The external electronic device 150 may report the remaining battery power to the electronic device 100 in operation 1205. For example, the external electronic device 150 may periodically or aperiodically transmit a communication signal containing the remaining battery power to the electronic device 100 via the established communication connection.

In operation 1207, the electronic device 100 may detect a wireless charging start condition. For example, the electronic device 100 may detect the wireless charging start condition by detecting the remaining battery power of the external electronic device 150 being a designated value or less. Further, the external electronic device 150 may detect the wireless charging start condition in operation 1209. The external electronic device 150 may also detect the wireless charging start condition by detecting the remaining battery power being a designated value or less. In operation 1211, the electronic device 100 may perform path guiding. In operation 1213, the external electronic device 150 may sense a signal output based on the path guiding and move to a designated position. In operation 1215, the electronic device 100 may start wireless charging.

Figure 13:
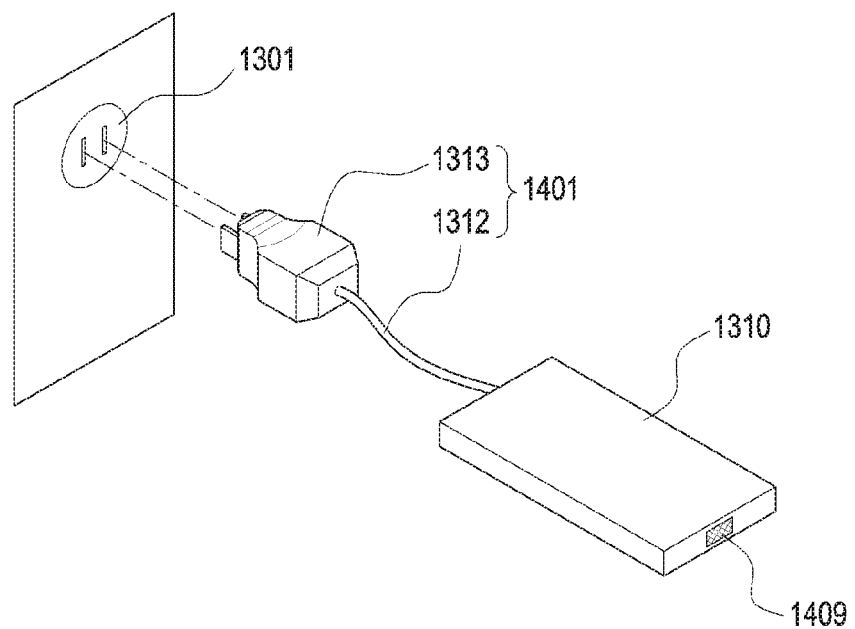
FIG. 13 is a concept view illustrating an electronic device, according to an embodiment.
Figure 14:
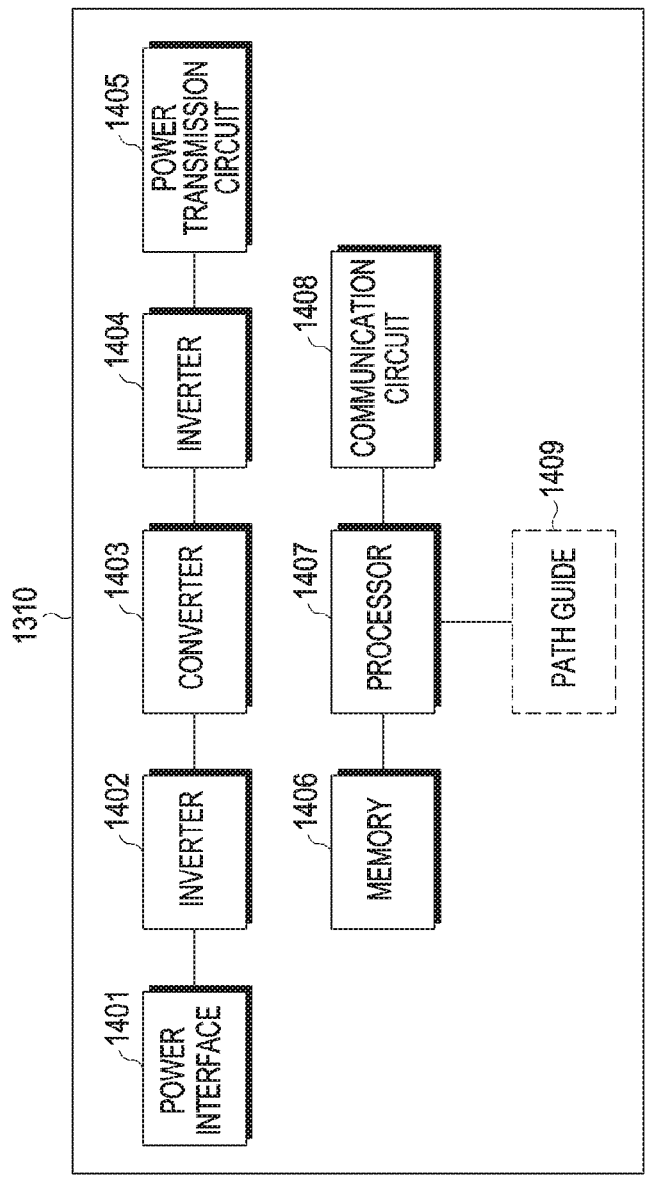
FIG. 14 is a block diagram illustrating an electronic device, according to an embodiment.

FIG. 13 is a concept view illustrating an electronic device, according to an embodiment. An embodiment related to FIG. 13 is described in greater detail with reference to FIG. 14. FIG. 14 is a block diagram illustrating an electronic device, according to an embodiment.

Referring to FIG. 13, an electronic device 1310 may include a plug 1313 that is insertable into a power outlet 1301 on the wall and an electric line 1312 for connecting the plug 1313. The electric line 1312 and the plug 1313 may be a power interface 1401. The electronic device 1310 may include a path guide 1409 disposed on one surface thereof. The electronic device 1310 may be disposed in a lower portion of a piece of home furniture.

Referring to FIG. 14, the electronic device 1310 may include at least one of a power interface 1401, an inverter 1402, a converter 1403, an inverter 1404, a power transmission circuit 1405, a memory 1406, a processor 1407, a communication circuit 1408, or a path guide 1409. The components identical to those in an embodiment of FIG. 3 are not described below.

The electronic device 1310 may receive AC power via the power interface 1401. The inverter 1402 may invert the received AC power into DC power. The inverter 1402 may include a rectification circuit. The converter 1403 may convert the voltage of the DC power. The converter 1403 may boost-convert or buck-convert the DC power. The inverter 1404 may receive the converted DC power and invert the DC power into AC power. The power transmission circuit 1405 may produce a magnetic field using the received AC power.

Figure 15:
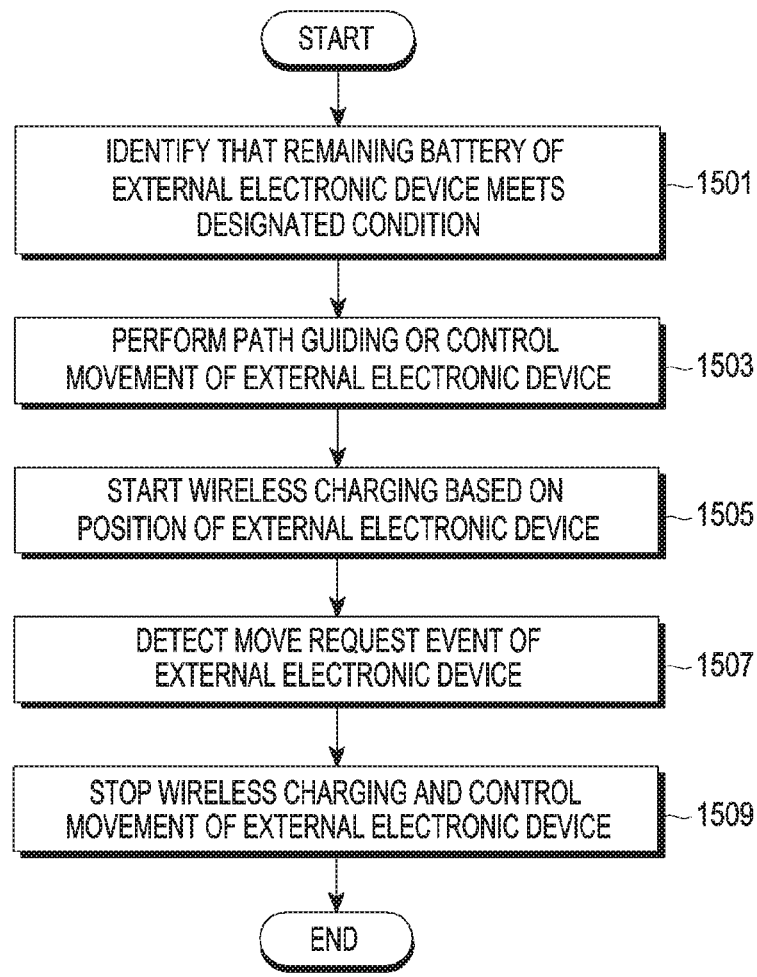
FIG. 15 is a flowchart illustrating a method for operating an electronic device, according to an embodiment.

FIG. 15 is a flowchart illustrating a method for operating an electronic device, according to an embodiment.

According to an embodiment, the electronic device 100 may identify that the remaining battery power of the external electronic device 150 meets a designated condition in operation 1501. For example, the electronic device 100 may identify that the remaining battery power is less than a threshold based on a communication signal received from the external electronic device 150. In operation 1503, the electronic device 100 may perform path guiding or control movement of the external electronic device 150. As set forth above, as the electronic device 100 performs path guiding, the external electronic device 150 may sense a signal by the path guiding and may move. The electronic device 100 may transmit a communication signal for directly controlling movement of the external electronic device 150 to the electronic device 150. The electronic device 100 may transmit a communication signal for controlling the external electronic device 150 to move to a designated position for wireless charging to the external electronic device 150. The external electronic device 150 may move to the designated position to perform wireless charging based on the received communication signal.

In operation 1505, the electronic device 100 may start wireless charging based on the position of the external electronic device 150. In operation 1507, the electronic device 100 may detect a move request event of the external electronic device 150. In operation 1509, the electronic device 100 may stop wireless charging and control movement of the external electronic device 150. For example, if the external electronic device 150 is implemented as a robot vacuum, the electronic device 100 may obtain information for the floor cleanup state and identify whether the floor is in the state of needing cleanup. Upon identifying that the floor state needs cleanup, the electronic device 100 may control movement of the external electronic device 150. The external electronic device 150 may move under the control of the electronic device 100 or may move along the path that it determined on its own.

The electronic device, the host device, and the external electronic device according to one or more embodiments may be one of various types of electronic devices. The electronic devices may include, e.g., a portable communication device (e.g., a smartphone), a computer device, a portable multimedia device, a portable medical device, a camera, a wearable device, or a home appliance. However, the electronic device is not limited to the above-listed embodiments.

It should be appreciated that various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the external electronic device 150). For example, a processor (e.g., the processor 152) of the machine (e.g., the external electronic device 150) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to one or more embodiments, there may be provided an electronic device which may be placed in a lower empty space of another pre-placed electronic device. According to one or more embodiments, there may be provided an electronic device including an emblem used for an electronic device to determine a path and a power transmission circuit, an electronic device determining a path using the emblem, and a method for controlling the same.

While the disclosure has been shown and described with reference to embodiments thereof, it will be understood by those skilled in the art that various changes in form and details may be made therein without departing from the spirit and scope of the disclosure as defined by the appended claims and their equivalents.

What is claimed is:

1. An electronic device coupled to a host device, the electronic device comprising:
    a housing detachable to the host device;
    a light generator disposed on a first surface of the housing;
    a power transmission circuit disposed on a second surface of the housing, the second surface being opposite to the first surface; and
    a processor configured to:
        control the light generator to output a light, wherein an external electronic device moves to a predetermined position based on the outputted light, and
        control to wirelessly transmit power to the external electronic device via the power transmission circuit based on the external electronic device being located at the predetermined position.

2. The electronic device of claim 1, wherein the processor is further configured to, based on detecting that the external electronic device has moved to the predetermined position, control to wirelessly transmit the power via the power transmission circuit.

3. The electronic device of claim 1, further comprising:
    a power interface;
    a converter configured to receive, via the power interface, direct current (DC) power from a power supply of the host device and convert a voltage of the received DC power into a predetermined magnitude of voltage; and
    an inverter configured to generate alternating current (AC) power based on the received DC power with the predetermined magnitude of voltage and provide the generated AC power to the power transmission circuit.

4. The electronic device of claim 1, further comprising:
    a power interface;
    a rectification circuit configured to receive, via the power interface, alternating current (AC) power from an external power source and rectify the received AC power to direct current (DC) power;
    a converter configured to receive the DC power from the rectification circuit and convert a voltage of the received DC power into a predetermined magnitude of voltage; and
    an inverter configured to generate AC power based on the received DC power with the predetermined magnitude of voltage and provide the generated AC power to the power transmission circuit.

5. The electronic device of claim 1, further comprising a data line configured to connect the processor and the light generator through the housing or along at least one surface of the housing,
    wherein the processor is further configured to output, through the data line to the light generator, data for controlling the light generator to output the light.

6. The electronic device of claim 1, wherein the light generator comprises at least one light emitting device configured to radiate infrared light in a predetermined range.

7. The electronic device of claim 1, further comprising a communication circuit configured to communicate with the external electronic device,
    wherein the processor is further configured to:

receive information for a remaining power of a battery of the external electronic device from the external electronic device via the communication circuit, and based on identifying that the remaining power of the battery of the external electronic device meets a predetermined condition, control the light generator to output the light.

8. The electronic device of claim 1, wherein the housing is further configured to be connected to a lower portion of a housing of the host device, and wherein the power transmission circuit is disposed in an inner lower portion of the electronic device.

9. An electronic device coupled to a host device, the electronic device comprising:

a housing detachable to the host device;

an emblem disposed on a first surface of the housing, the emblem being configured to assist with moving an external electronic device to a predetermined position for wireless charging;

a power transmission circuit disposed on a second surface of the housing, the second surface being opposite to the first surface; and a processor configured to control to wirelessly transmit power to the external electronic device via the power transmission circuit based on the external electronic device being located at the predetermined position.

10. The electronic device of claim 9, wherein the processor is configured to, based on detecting that the external electronic device has moved to the predetermined position, control to wirelessly transmit the power via the power transmission circuit.

11. The electronic device of claim 9, further comprising:

a power interface;

a converter configured to receive, via the power interface, direct current (DC) power from a power supply of the host device and convert a voltage of the received DC power into a predetermined magnitude of voltage; and an inverter configured to generate alternating current (AC) power based on the received DC power with the predetermined magnitude of voltage and provide the generated AC power to the power transmission circuit.

12. The electronic device of claim 9, further comprising:

a power interface;

a rectification circuit configured to receive, via the power interface, alternating current (AC) power from an external power source and rectify the received AC power to direct current (DC) power;

a converter configured to receive the DC power from the rectification circuit and convert a voltage of the received DC power into a predetermined magnitude of voltage; and an inverter configured to generate AC power based on the received DC power with the predetermined magnitude of voltage and provide the generated AC power to the power transmission circuit.

13. The electronic device of claim 9, further comprising a communication circuit configured to communicate with the external electronic device, wherein the processor is further configured to:

receive information for a remaining power of a battery of the external electronic device from the external electronic device via the communication circuit, and based on identifying that the remaining power of the battery of the external electronic device meets a predetermined condition, transmit a communication signal to control the external electronic device to move to the predetermined position.

14. The electronic device of claim 9, wherein the housing is further configured to be connected to a lower portion of a housing of the host device, and wherein the power transmission circuit is disposed in an inner lower portion of the electronic device.

15. The electronic device of claim 9, wherein the emblem is disposed in a position where it is sensed by the external electronic device.

16. The electronic device of claim 9, wherein the external electronic device is configured to:

identify a captured image of the emblem, and perform either one or both of moving and rotating until a pattern corresponding to the emblem meets a predetermined condition.

17. An electronic device coupled to a host device, the electronic device comprising:

a housing detachable to the host device;

a light generator disposed on a first surface of the housing;

a bottom tray disposed in a lower portion of the housing, the bottom tray being withdrawable to an outside of the host device;

a power transmission circuit disposed in the bottom tray; and a processor configured to:

control to cause the bottom tray to be positioned inside the host device;

control the light generator to output a light, wherein an external electronic device moves to a predetermined position based on the outputted light;

control to cause the bottom tray to be positioned outside the host device before the external electronic device moves to the predetermined position; and control to wirelessly transmit power via the power transmission circuit after the external electronic device moves to the predetermined position.

18. The electronic device of claim 17, wherein a lower portion of the bottom tray has a first width, wherein an upper portion of the bottom tray has a second width, and wherein the first width is larger than the second width.

19. The electronic device of claim 18, wherein the external electronic device has substantially a same width as the second width, wherein a power transmission coil of the power transmission circuit is disposed at a point that is a first distance away from the lower portion of the bottom tray, and wherein a power reception coil is disposed at a point that is the first distance away from a side of the external electronic device.

20. The electronic device of claim 17, wherein the external electronic device comprises a dust container, and wherein the bottom tray includes a pipe configured to connect with the dust container of the external electronic device.

* * * * *